United States Patent
Su et al.

(10) Patent No.: US 7,720,168 B2
(45) Date of Patent: May 18, 2010

(54) SYSTEMS AND METHODS FOR CODING IN BROADBAND WIRELESS COMMUNICATION SYSTEMS TO ACHIEVE MAXIMUM DIVERSITY IN SPACE, TIME AND FREQUENCY

(75) Inventors: Weifeng Su, Tonawanda, NY (US); K. J. Ray Liu, Potomac, MD (US); Zoltan Safar, Budapest (HU)

(73) Assignee: University of Maryland, College Park, MD (US)

( * ) Notice: Subject to any disclaimer, the term of this patent is extended or adjusted under 35 U.S.C. 154(b) by 771 days.

(21) Appl. No.: 11/137,589

(22) Filed: May 26, 2005

(65) Prior Publication Data

US 2006/0034383 A1    Feb. 16, 2006

Related U.S. Application Data

(60) Provisional application No. 60/574,468, filed on May 26, 2004.

(51) Int. Cl.
*H04B 7/02* (2006.01)
*H04L 1/02* (2006.01)
(52) U.S. Cl. .................................................. 375/267
(58) Field of Classification Search ................. 375/267
See application file for complete search history.

(56) References Cited

U.S. PATENT DOCUMENTS

| 7,280,604 B2 * | 10/2007 | Giannakis et al. | 375/260 |
|---|---|---|---|
| 2003/0235255 A1 * | 12/2003 | Ketchum et al. | 375/285 |
| 2004/0257978 A1 | 12/2004 | Shao et al. | |
| 2005/0074068 A1 * | 4/2005 | Borran et al. | 375/264 |
| 2005/0135498 A1 * | 6/2005 | Yee | 375/267 |
| 2005/0243855 A1 * | 11/2005 | Dominique et al. | 370/441 |
| 2005/0249306 A1 * | 11/2005 | Chae et al. | 375/267 |

OTHER PUBLICATIONS

Tarokh, V, et al.; "Space-Time Codes for High Data Rate Wireless Communication: Performance Criterion and Code Construction"; IEEE Transactions on Information Theory; vol. 44, No. 2, Mar. 1998; pp. 744-765.

Zhu, H.; et al.; "Pilot Embedding for Joint Channel Estimation and Data Detection in MIMO Communication Systems"; IEEE Communications Letters; vol. 7, No. 1, Jan. 2003; pp. 30-32.

Cheon, H., et al.; "Performance Analysis of Space-Time Block Codes in Time-Varying Rayleigh Fading Channels", IEEE International Conference on Acoustics, Speech, and Signal Processing, 2002 Proceedings. (ICASSP '02); vol. 3, 2002; pp. III-2357-III-2360.

(Continued)

*Primary Examiner*—David C Payne
*Assistant Examiner*—Tanmay K Shah
(74) *Attorney, Agent, or Firm*—Rosenberg, Klein & Lee

(57) ABSTRACT

Maximum diversity in multiple antenna distributed frequency broadband systems such as MIMO-OFDM is achievable through space-frequency (SF) and space-time-frequency (STF) coding. Full-rate full-diversity coding is achieved through a combination of maximal minimum product distance symbol set design and formation of codeword blocks. Full-diversity codes are also achieved which have reduced symbol transmission rates, such as through mapping of space-time (ST) codes to SF codes. The reduction in symbol rate may be offset by the fact that any ST code may be mapped to a full-diversity SF code.

20 Claims, 17 Drawing Sheets

OTHER PUBLICATIONS

Rao, D., et al.; "Low-complexity, Full-diversity Space-Time-Frequency Block Codes for MIMO-OFDM"; in Proceedings Globecom '04; IEEE Global Telecommunications Conference; Dallas,Texas 2004; vol. 1, pp. 204-208.

* cited by examiner

US 7,720,168 B2

SYSTEMS AND METHODS FOR CODING IN BROADBAND WIRELESS COMMUNICATION SYSTEMS TO ACHIEVE MAXIMUM DIVERSITY IN SPACE, TIME AND FREQUENCY

RELATED APPLICATION DATA

The invention described herein is based on Provisional Patent Application Ser. No. 60/574,468, filed on 26 May 2004.

STATEMENT REGARDING GOVERNMENT SPONSORED RESEARCH

The invention described herein was developed through research funded under federal contract. As such, the United States Government has certain rights thereto.

BACKGROUND OF THE INVENTION

1. Field of the Invention

The invention described herein is related to encoding data streams in a wireless communications network. More specifically, the invention is directed to encoding data in multiple-channel, multiple-frequency communication systems so as to provide maximum diversity in space-frequency or in space-time-frequency.

2. Description of the Prior Art

Multiple-input multiple-output (MIMO) orthogonal frequency division multiplexing (OFDM) communication systems, referred to as MIMO-OFDM have exhibited great potential in broadband communications. By employing multiple transmit and multiple receive antennas, many of the adverse effects typically encountered in wireless transmission may be reduced. OFDM modulation may mitigate frequency selective transmission by establishing a plurality of parallel flat-fading channels, thereby providing high spectral efficiency and eliminating the need for complex equalization technology.

Two MIMO-OFDM coding techniques are prevalent in the current art: space-frequency (SF) coding within an OFDM block exploits spatial and frequency diversities, and space-time-frequency (STF) coding, where coding is applied over multiple OFDM blocks to additionally exploit temporal diversities.

Previous SF coding systems have fallen short of achieving full diversity in both space and frequency, usually achieving full diversity in one realm at the expense of full diversity in the other. The same is true for STF codes—full diversity across all three of space, time and frequency has proven elusive. Thus, there is an apparent need for SF and STF coding which can guarantee full-diversity concurrently across all applicable domains.

SUMMARY OF THE INVENTION

In one aspect of the present invention, a method is provided for conveying an encoded data stream in a wireless communication system in a manner that achieves maximum space-frequency or space-time-frequency diversity. A transmitter is provided with a plurality of transmit antennas and means for simultaneously transmitting through each antenna a corresponding symbol over a corresponding one of a plurality of frequencies. A receiver is provided with a plurality of receive antennas and means for recovering the data stream from the symbols transmitted over the plurality of frequencies. The region of space between each transmit antenna and each receive antenna defines a corresponding transmission channel. By way of the present invention, a first codeword is formed from symbols corresponding to data in a data stream. A transform is applied to the first codeword to produce a second codeword. The transform may operate on the symbols of the first codeword themselves or may simply arrange the first codeword into the second codeword in an appropriate manner. The second codeword includes a plurality of column vectors equal in number to the number of transmit antennas and a plurality of rows equal in number to an integer multiple of the plurality of frequencies. The second codeword is transmitted such that the symbols in each column thereof are transmitted via a corresponding one of the transmit antennas and symbols in each row thereof are transmitted over a corresponding frequency. The second codewords are received at the receiver and the data stream is recovered therefrom.

In another aspect of the invention, an apparatus for conveying data in a broadband wireless communication system is provided. The apparatus includes a transmitter having a plurality of transmit antennas and a plurality of orthogonal frequency modulators. The frequency modulators are operable to modulate a transmission symbol onto each of a corresponding plurality of frequencies. The apparatus further includes an encoder for encoding a data stream into a codeword, where the codeword is characterized by a matrix of transmission symbols having a plurality of columns equal in number to the number of transmit antennas and a plurality of rows equal in number to an integer multiple of the number of frequencies. The encoder is coupled to the transmitter such that a transmission symbol in a row of the codeword and at a column of the codeword and is transmitted via a transmit antenna corresponding to the column of the codeword over a frequency corresponding to the row of the codeword. The encoder is further operable to establish a set of symbols in which a minimum product distance is maximized, where the established set encompasses the transmission symbols of the codeword. The apparatus also includes a receiver having a plurality of receive antennas and a plurality of orthogonal frequency demodulators for demodulating each of the corresponding frequencies. A decoder is coupled to the receiver for decoding the transmitted codeword and recovering therefrom the data stream.

In yet another aspect of the present invention, an apparatus is provided having a transmitter with a plurality of transmit antennas and a plurality of orthogonal frequency modulators for modulating a transmission symbol onto each of a corresponding plurality of frequencies and a receiver having a plurality of receive antennas and a plurality of orthogonal frequency demodulators for demodulating each of the plurality of frequencies. The apparatus includes an encoder for encoding a data stream into a first codeword and a mapper for mapping the first codeword onto a second codeword. The second codeword is characterized by a matrix of transmission symbols having a plurality of columns equal in number to the number of transmit antennas and a plurality of rows equal in number to an integer multiple of the plurality of frequencies. The encoder is coupled to the transmitter such that a transmission symbol at a column and row of the second codeword is transmitted, respectively, via a transmit antenna corresponding to the column and over a frequency corresponding to the row. A decoder coupled to the receiver decodes the transmitted codeword and recovers the data stream therefrom.

DESCRIPTION OF THE PREFERRED EMBODIMENTS

1. Transmission Channel Model

Figure 1:
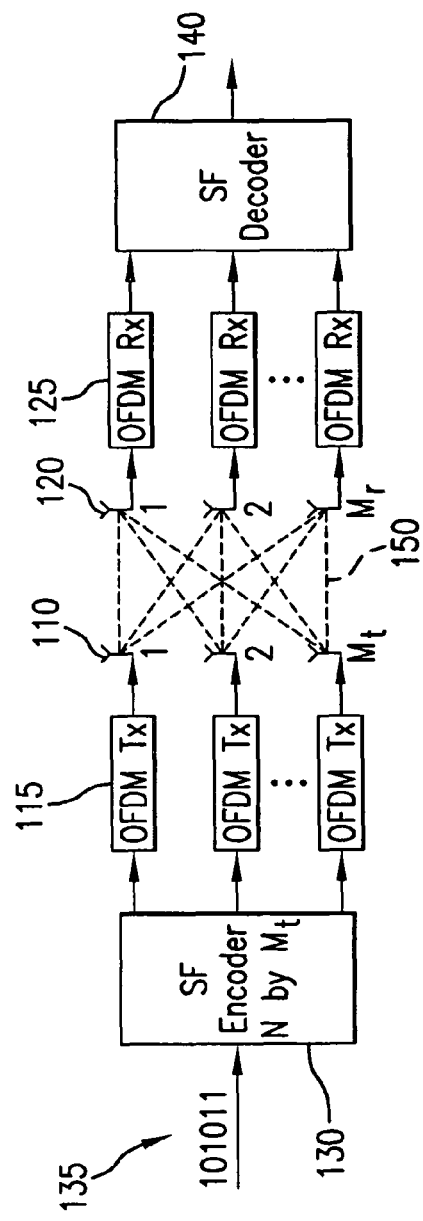
FIG. 1 is a schematic block diagram illustrating an exemplary embodiment of an apparatus operable in accordance with the present invention.

To illustrate certain aspects of the present invention, it is believed beneficial to characterize the transmission channels by way of a model. Referring to FIG. 1, there is shown a MIMO-OFDM wireless communication system having $M_t$ transmit antennas 110, $M_r$ receive antennas 120 and N sub-carriers. Each channel 150 is assumed to be a frequency selective fading channel between each pair of transmit and receive antennas having L independent delay paths and the same power delay profile. The channel impulse response of each MIMO channel is assumed to be constant over each OFDM block period, but may vary from one OFDM block to another. For the k-th OFDM block, the channel impulse response from transmit antenna i to receive antenna j at time τ can be modeled as $$h_{i,j}^k(\tau) = \sum_{l=0}^{L-1} \alpha_{i,j}^k(l)\delta(\tau - \tau_l), \quad (1)$$

where $\tau_l$ is the delay and $\alpha_{i,j}^k(l)$ is the complex amplitude of the l-th path between transmit antenna i and receive antenna j. The $\alpha_{i,j}^k(l)$'s are modeled as zero-mean, complex Gaussian random variables with variances $E|\alpha_{i,j}^k(l)|^2, =\delta_l^2$, where the operator E is that of probabilistic expectation. The power of the signal in the L paths are normalized such that $\Sigma_{l=0}^{L-1} \delta_l^2 = 1$. From (1), the frequency response of the channel is given by $$H_{i,j}^k(f) = \sum_{l=0}^{L-1} \alpha_{i,j}^k(l)e^{-j2\pi f\tau_l}, \quad (2)$$

where $j=\sqrt{-1}$ is the imaginary unit.

To achieve diversity across space, time and frequency, space-time-frequency (STF) coding across $M_t$ transmit antennas, N OFDM subcarriers and K consecutive OFDM blocks is first considered. The input bit stream 135 is divided into b bit long segments, and each segment is mapped onto a codeword. In the STF case, an STF codeword can be expressed as a $KN \times M_t$ matrix $$C = [C_1^T C_2^T \ldots C_K^T]^T, \quad (3)$$

where the channel symbol matrix $C_k$ is given by $$C_k = \begin{bmatrix} c_1^k(0) & c_2^k(0) & \cdots & c_{M_t}^k(0) \\ c_1^k(1) & c_2^k(1) & \cdots & c_{M_t}^k(1) \\ \vdots & \vdots & \cdots & \vdots \\ c_1^k(N-1) & c_2^k(N-1) & \cdots & c_{M_t}^k(N-1) \end{bmatrix}, \quad (4)$$

and $c_i^k(n)$ is the channel symbol transmitted over the n-th sub-carrier by transmit antenna i in the k-th OFDM block. The STF code is assumed to satisfy the energy constraint $E\|C\|_F^2 = KNM_t$, where $\|C\|_F$ is the Frobenius norm of C i.e.,:

$$\|C\|_f^2 = tr(C^\Psi C) = tr(CC^\Psi) = \sum_{n=0}^{N-1}\sum_{i=1}^{M_t} |c_i(n)|^2. \quad (5)$$

During the k-th OFDM block period, the transmitter, at each OFDM Tx processors 115, applies an N-point IFFT to each column of the matrix $C_k$. After appending a cyclic prefix, the OFDM symbol corresponding to the i-th (i=1, 2, ..., $M_t$) column of $C_k$ is transmitted by transmit antenna i. In accordance with the conventions of the art, all of the $M_t$ OFDM symbols are transmitted simultaneously from different transmit antennas.

At the receiver, after matched filtering, removing the cyclic prefix, and applying FFT at OFDM Rx processor 125, the received signal at the n-th subcarrier at receive antenna j in the k-th OFDM block is given by $$y_j^k(n) = \sqrt{\frac{\rho}{M_t}} \sum_{i=1}^{M_T} c_i^k(n) H_{i,j}^k(n) + z_j^k(n), \quad (6)$$

$$H_{i,j}^k(n) = \sum_{l=0}^{L-1} \alpha_{i,j}^k(l) e^{-2\pi n \Delta f \tau_l} \quad (7)$$

is the channel frequency response at the n-th subcarrier between transmit antenna i and receive antenna j, $\Delta f = 1/T$ is the subcarrier separation in the frequency domain, and T is the OFDM symbol period. It is assumed that the channel state information $H_{i,j}^k(n)$ is known at the receiver, but not at the transmitter. In (6), $z_j^k(n)$ denotes the additive white complex Gaussian noise with zero mean and unit variance in the n-th sub-carrier at receive antenna j in the k-th OFDM block. The factor $\sqrt{\rho/M_t}$ in (6) ensures that $\rho$ is the average signal to noise ratio (SNR) at each receive antenna, independently of the number of transmit antennas.

In certain implementations of the present invention, temporal variability in the transmission channel is ignored. As such, the channel impulse response from transmit antenna i to receive antenna j is simplified and is modeled as $$h_{i,j}(\tau) = \sum_{l=0}^{L-1} \alpha_{i,j}(l) \delta(\tau - \tau_l), \quad (8)$$

where, still, $\tau_l$ is the delay of the l-th path, and $\alpha_{i,j}(l)$ is the complex amplitude of the l-th path, where each $\alpha_{i,j}(l)$ is modeled as a zero-mean, complex Gaussian random variables with variance $E|\alpha_{i,j}(l)|^2 = \delta_l^2$. The powers of the L paths are once again normalized such that $\Sigma_{l=0}^{L-1} \delta_l^2 = 1$. From (7), the frequency response of the temporally invariant channel is given by $$H_{i,j}(f) = \sum_{l=0}^{L-1} \alpha_{i,j}(l) e^{-j2\pi f \tau_l}. \quad (9)$$

It is assumed that the MIMO channel is spatially uncorrelated, i.e. the channel taps $\alpha_{i,j}(l)$ are independent for different indices (i, j).

In the space-frequency (SF) diversity case, each b bit long segment of the input bit stream 135 is mapped onto an SF codeword, which can be represented by an $N \times M_t$ matrix $$C = \begin{bmatrix} c_1(0) & c_2(0) & \cdots & c_{M_t}(0) \\ c_2(0) & c_2(1) & \cdots & c_{M_t}(1) \\ \vdots & \vdots & \ddots & \vdots \\ c_1(N-1) & c_2(N-1) & \cdots & c_{M_t}(N-1) \end{bmatrix}, \quad (10)$$

where $c_i(n)$ denotes the channel symbol transmitted over the n-th subcarrier by transmit antenna i. The SF code is assumed to satisfy the energy constraint $E\|C\|_F^2 = NM_t$. The OFDM transmitter applies an N-point IFFT via OFDM Tx processor 115 to each column of the matrix C, and after appending the cyclic prefix, the OFDM symbol corresponding to the i-th ($i = 1, 2, \ldots, M_t$) column of C is transmitted by transmit antenna i.

At the receiver, after matched filtering, removing the cyclic prefix, and applying FFT via OFDM Rx processor 125, the received signal at the n-th subcarrier at receive antenna j is given by $$y_j(n) = \sqrt{\frac{\rho}{M_t}} \sum_{i=1}^{M_t} c_i(n) H_{i,j}(n) + z_j(n), \text{ where} \quad (11)$$

$$H_{i,j}(n) = \sum_{l=0}^{L-1} \alpha_{i,j}(l) e^{-j2\pi n \Delta f \tau_l} \quad (12)$$

is the channel frequency response at the n-th subcarrier between transmit antenna i and receive antenna j, $\Delta f = 1/T$ is the subcarrier separation in the frequency domain, and T is the OFDM symbol period. Again, it is assumed that the channel state information $H_{i,j}(n)$ is known at the receiver, but not at the transmitter. In (11), $z_j(n)$ denotes the additive complex Gaussian noise with zero mean and unit variance at the n-th subcarrier at receive antenna j. The noise samples $z_j(n)$ are assumed to be uncorrelated for different j's and n's.

2. Code Design Criteria

The performance criteria for coded MIMO-OFDM systems will now be derived based on the STF channel model to determine the maximum achievable diversity order for such systems. Using the notation $c_i((k-1)N+n) \triangleq c_i^k(n)$, $H_{i,j}((k-1)N+n) \triangleq H_{i,j}^k(n)$, $y_j((k-1)N+n) \triangleq y_j^k(n)$, and $z_j((k-1)N+n) \triangleq z_j^k(n)$ for $1 \leq k \leq K$, $0 \leq n \leq N-1$, $1 \leq i \leq M_t$ and $1 \leq j \leq M_r$, the received signal in (6) can be expressed as $$y_j(m) = \sqrt{\frac{\rho}{M_t}} \sum_{i=1}^{M_t} c_i(m) H_{i,j}(m) + z_j(m), \quad (13)$$

for $m = 0, 1, \ldots KN-1$. The received signal may be rewritten in vector form as $$Y = \sqrt{\frac{\rho}{M_t}} DH + Z, \quad (14)$$

where D is a $KNM_r \times KNM_tM_r$ matrix constructed from the STF codeword C in (3) as follows:

$$D = I_{M_r} \otimes [D_1 \, D_2 \ldots D_{M_t}], \quad (15)$$

where $\otimes$ denotes the tensor product, $I_{M_r}$ is the identity matrix of size $M_r \times M_r$, and $$D_i = \text{diag}\{c_i(0), c_i(1), \ldots, c_i(KN-1)\} \quad (16)$$

for any $i = 1, 2, \ldots, M_t$. The channel vector H of size $KNM_tM_r \times 1$ is formatted as $$H = [H_{l,1}^T \ldots H_{M_t,1}^T \, H_{l,2}^T \ldots H_{M_t,2}^T \ldots H_{l,M_r}^T \ldots H_{M_t,M_r}^T]^T, \quad (17)$$

where $$H_{i,j} = [H_{i,j}(0)\ H_{i,j}(1) \ldots H_{i,j}(KN-1)]^T \quad (18)$$

The received signal vector Y of size $KNM_r \times 1$ is given by $$Y = [y_1(0) \ldots y_1(KN-1)\ y_2(0) \ldots y_2(KN-1) \ldots y_{M_r}(0) \ldots y_{M_r}(KN-1)]^T, \quad (19)$$

and the noise vector Z has the same form as Y, i.e., $$Z = [z_1(0) \ldots z_1(KN-1)\ z_2(0) \ldots z_2(KN-1) \ldots z_{M_r}(0) \ldots z_{M_r}(KN-1)]^T, \quad (20)$$

Suppose that D and $\tilde{D}$ are two matrices constructed from two different codewords C and $\tilde{C}$, respectively. Then, the pair-wise error probability between D and $\tilde{D}$ can be upper bounded as $$P(D \to \tilde{D}) \leq \binom{2r-1}{r}\left(\prod_{i=1}^{r} \gamma_i\right)^{-1}\left(\frac{\rho}{M_t}\right)^{-r}, \quad (21)$$

where r is the rank of $(D-\tilde{D})R(D-\tilde{D})^\Psi$, $\gamma_1, \gamma_2, \ldots, \gamma_r$ are the non-zero eigenvalues of $(D-\tilde{D})R(D-\tilde{D})^\Psi$, and $R = E\{HH^\Psi\}$ is the correlation matrix of H. The symbol $\Psi$ is used herein to denote the complex conjugate transpose of a matrix, i.e., $(A^*)^T = (A^T)^* = A^\Psi$ is the transpose of the complex conjugate of the matrix A. Based on the upper bound on the pair-wise error probability in (21), two general code performance criteria can be proposed as follows: Diversity (rank) criterion where the minimum rank of $(D-\tilde{D})R(D-\tilde{D})^\Psi$ over all pairs of different codewords C and $\tilde{C}$ should be as large as possible, or product criterion; where the minimum value of the product $\Pi_{i=1}^{r}\gamma_i$ over all pairs of different codewords C and $\tilde{C}$ should be maximized.

The channel frequency response vector between transmit antenna i and receive antenna j for the time invariant case can be similarly denoted by $$H_{i,j} = [H_{i,j}(0)\ H_{i,j}(1) \ldots H_{i,j}(N-1)]^T. \quad (22)$$

Using the notation $\omega = e^{-j2\pi\Delta f}$, $H_{i,j}$ can be decomposed as:

$$H_{i,j} = W \cdot A_{i,j}, \quad (23)$$

where $$W = \begin{bmatrix} 1 & 1 & \cdots & 1 \\ \omega^{\tau_0} & \omega^{\tau_1} & \cdots & \omega^{\tau_{L-1}} \\ \vdots & \vdots & \ddots & \vdots \\ \omega^{(N-1)\tau_0} & \omega^{(N-1)\tau_1} & \cdots & \omega^{(N-1)\tau_{L-1}} \end{bmatrix}_{N \times L},$$

which is related to the delay distribution, and $$A_{i,j} = [\alpha_{i,j}(0)\alpha_{i,j}(1) \ldots \alpha_{i,j}(L-1)]^T,$$

which is related to the power distribution of the channel impulse response. In general, W is not a unitary matrix. If all of the L delay paths fall at the sampling instances of the receiver, W is part of the DFT-matrix, which is unitary. From (23), the correlation matrix of the channel frequency response vector between transmit antenna I and receive antenna j can be calculated as:

$$R_{i,j} = E\{H_{i,j}H_{i,j}^\Psi\} \quad (24)$$
$$= WE\{A_{i,j}A_{i,j}^\Psi\}W^\Psi$$
$$= W\operatorname{diag}\{\delta_0^2, \delta_1^2, \ldots, \delta_{L-1}^2\}W^\Psi$$

The third equality follows from the assumption that the path gains $\alpha_{i,j}(l)$ are independent for different paths and different pairs of transmit and receive antennas. Note that the correlation matrix R is independent of the transmit and receive antenna indices i and j.

For two distinct SF codewords C and $\tilde{C}$, the notation $$\Delta = (C-\tilde{C})(C-\tilde{C})^\Psi \quad (25)$$

is used. The pair-wise error probability between C and $\tilde{C}$ can be upper bounded as $$P(C \to \tilde{C}) \leq \binom{2vM_r-1}{vM_r}\left(\prod_{i=1}^{v}\lambda_i\right)^{-M_r}\left(\frac{\rho}{M_t}\right)^{-vM_r} \quad (26)$$

where $v$ is the rank of $\Delta \circ R$, $\gamma_1, \gamma_2, \ldots \gamma_v$ are the non-zero eigenvalues of $\Delta \circ R$, and $\circ$ denotes the Hadamard product. Recall that if $A = \{a_{i,j}\}$ and $B = \{b_{i,j}\}$ are matrices of size m×n, then the Hadamard product $$A \circ B = \begin{bmatrix} a_{1,1}b_{1,1} & \cdots & a_{1,n}b_{1,n} \\ \vdots & \ddots & \vdots \\ a_{m,1}b_{m,1} & \cdots & a_{m,n}b_{m,n} \end{bmatrix}.$$

Based on the upper bound (26), the two SF code design criteria are similar to those above. Diversity (rank) criteria may be used, where the minimum rank of $\Delta \circ R$ over all pairs of distinct codewords C and $\tilde{C}$ should be as large as possible, and product criteria may be used, where the minimum value of the product $\Pi_{i=1}^{v}\lambda_i$ over all pairs of distinct codewords C and $\tilde{C}$ is maximized.

3. Full-Rate and Full-Diversity SF Code Design

If the minimum rank of $\Delta \circ R$ is $v_0$ for any pair of distinct codewords C and $\tilde{C}$, the SF code is said to achieve a diversity order of $v_0 M_r$. According to a rank inequality on Hadamard products, it is known that $\operatorname{rank}(\Delta \circ R) \leq \operatorname{rank}(\Delta)\operatorname{rank}(R)$. Since the rank of $\Delta$ is at most $M_t$, the rank of R is at most L, and the rank of $\Delta \circ R$ is at most N, the maximum achievable diversity (or full diversity) is at most min $\{LM_tM_r, NM_r\}$. Clearly, in order to achieve a diversity order of $v_0 M_r$, the number of non-zero rows of C and $\tilde{C}$ cannot be less than $v_0$ for any pair of distinct SF codewords C and $\tilde{C}$. If a SF code achieves full diversity, the diversity product, which is the normalized coding advantage, is given by:

$$\zeta = \frac{1}{2\sqrt{M_t}}\min_{C \neq \tilde{C}}\left|\prod_{i=1}^{v}\lambda_i\right|^{\frac{1}{2v}} \quad (27)$$

where $\lambda_1, \lambda_2, \ldots \lambda_v$ are the non-zero eigenvalues of $\Delta \circ R$ for any pair of distinct codewords C and $\tilde{C}$.

Certain embodiments of the present invention provide a systematic method to obtain full-rate SF codes achieving full diversity in space and frequency. Specifically, a class of SF codes can be designed through the present invention that can achieve a diversity order of $\Gamma M_t M_r$ for any fixed integer $\Gamma$, ($1 \leq \Gamma \leq L$).

In accordance with certain embodiments of the invention, each SF codeword C is a concatenation of some matrices $G_p$:

$$C = [G_1^T G_2^T \ldots G_P^T 0_{N-P\Gamma M_t}^T]^T, \quad (28)$$

where $P = \lfloor N/(\Gamma M_t) \rfloor$, and each matrix $G_p$, $p = 1, 2, \ldots, P$, is of size $\Gamma M_t$ by $M_t$. The zero padding in (28) is used if the number of subcarriers N is not an integer multiple of $\Gamma M_t$. Each matrix $G_p$, ($1 \leq p \leq P$), has the same structure given by $$G = \sqrt{M_t} \operatorname{diag}(X_1, X_2, \ldots, X_{M_t}), \quad (29)$$

where $\operatorname{diag}(X_1, X_2, \ldots, X_{M_t})$ is a block diagonal matrix, $X_i = [x_{(i-1)\Gamma+1} \ x_{(i-1)\Gamma+2} \ \ldots \ x_{i\Gamma}]^T$ $i = 1, 2, \ldots, M_t$, and all $x_k$, $k = 1, 2, \ldots, \Gamma M_t$ are complex symbols and are discussed below. The energy constraint of $E(\Sigma_{k=1}^{\Gamma M_t} |x_k|^2) = \Gamma M_t$ applies. The selection of the symbols $X = [x_1 \ x_2 \ \ldots \ x_{\Gamma M_t}]$ is independent for each $G_p$ ($1 \leq p \leq P$). The symbol rate of the resulting code is $P\Gamma M_t / N$, ignoring the cyclic prefix. If N is a multiple of $\Gamma M_t$, zero padding of the codeword C is not required and transmission is at full rate, i.e., the symbol rate is 1. If not, the rate is less than 1, but since N is usually much greater than $\Gamma M_t$, the symbol rate is very close to 1.

Sufficient conditions for the SF codes described above to achieve a diversity order of $\Gamma M_t M_r$ will now be derived. As noted above, to determine the diversity criterion, the rank of $\Delta \circ R$ must be known, where $\Delta$ is defined in (25) and R is the correlation matrix defined in (24). Suppose that C and $\tilde{C}$ are two distinct SF codewords which are constructed from $G_1, G_2, \ldots, G_P$ and $\tilde{G}_1, \tilde{G}_2, \tilde{G}_P$, respectively. Then, there exists at least one index $p_0$, ($1 \leq p_0 \leq P$) such that $G_{p_0} \neq \tilde{G}_{p_0}$. It may be further assumed that $G_p = \tilde{G}_p$ for any $p \neq p_0$, since it has been shown that the minimum rank of $\Delta \circ R$ can be obtained under this assumption.

From (24), we know that the correlation matrix $R \triangleq \{r_{i,j}\}_{1 \leq i,j \leq N}$ is a Toeplitz matrix. The entries of R are given by $$r_{i,j} = \sum_{l=0}^{L-1} \delta_l^2 \omega^{(i-j)\tau_l}, \quad 1 \leq i, j \leq N. \quad (30)$$

Under the assumption that $G_p = \tilde{G}_p$ for any $p \neq p_0$, the non-zero eigenvalues of $\Delta \circ R$ are the same as those of $[(G_{p_0} - \tilde{G}_{p_0})(G_{p_0} - \tilde{G}_{p_0})^\Psi] \circ Q$, where $Q = \{q_{i,j}\}_{1 \leq i,j \leq \Gamma M_t}$ is also a Toeplitz matrix whose entries are $$q_{i,j} = \sum_{l=0}^{L-1} \delta_l^2 \omega^{(i-j)\tau_l}, \quad 1 \leq i, j \leq \Gamma M_t. \quad (31)$$

Note that Q is independent of the index $p_0$, i.e., it is independent of the position of $G_{p_0} - \tilde{G}_{p_0}$ in $C - \tilde{C}$. Suppose that $G_{p_0}$ and $\tilde{G}_{p_0}$ have symbols $X = [x_1 \ x_2 \ \ldots \ x_{\Gamma M_t}]$ and $\tilde{X} = [\tilde{x}_1 \ \tilde{x}_2 \ \tilde{x}_{\Gamma M_t}]$, respectively. Then, the difference matrix between $G_{p_0}$ and $\tilde{G}_{p_0}$ is $$G_{p_0} - \tilde{G}_{p_0} = \sqrt{M_t} \operatorname{diag}((X_1 - \tilde{X}_1), (X_2 - \tilde{X}_2), \ldots, \quad (32)$$

$$(X_{M_t} - \tilde{X}_{M_t})$$

$$= \sqrt{M_t} (X - \tilde{X})(I_{M_t} \otimes 1_{\Gamma \times 1}),$$

where $\operatorname{diag}(X - \tilde{X}) \triangleq \operatorname{diag}((x_1 - \tilde{x}_1), (x_2 - \tilde{x}_2), \ldots, (x_{\Gamma M_t} - \tilde{x}_{\Gamma M_t}))$, $I_{M_t}$ is the identity matrix of size $M_t \times M_t$, $1_{\Gamma \times 1}$ is an all one matrix of size $\Gamma \times 1$, and $\otimes$ is the tensor product operator. Thus, $$[(G_{p_0} - \tilde{G}_{p_0})(G_{p_0} - \tilde{G}_{p_0})^\Psi] \circ Q = M_t [\operatorname{diag}(X - \tilde{X})(I_{M_t} \otimes 1_{\Gamma \times 1}) \quad (33)$$

$$(I_{M_t} \otimes 1_{\Gamma \times 1})^\Psi \operatorname{diag}(X - \tilde{X})^\Psi] \circ Q$$

$$= M_t [\operatorname{diag}(X - \tilde{X})(I_{M_t} \otimes 1_{\Gamma \times \Gamma})$$

$$\operatorname{diag}(X - \tilde{X})^\Psi] \circ Q$$

$$= M_t [\operatorname{diag}(X - \tilde{X})[(I_{M_t} \otimes 1_{\Gamma \times \Gamma})] \circ Q$$

$$\operatorname{diag}(X - \tilde{X})^\Psi.$$

In the above derivation, the second equality follows from the identities $[I_{M_t} \otimes 1_{\Gamma \times 1}]^\Psi = I_{M_t} \otimes 1_{1 \times \Gamma}$ and $(A_1 \otimes B_1)(A_2 \otimes B_2)(A_3 \otimes B_3) = (A_1 A_2 A_3) \otimes (B_1 B_2 B_3)$, and the last equality follows from a property of the Hadamard product. If all of the eigenvalues of $[(G_{p_0} - \tilde{G}_{p_0})(G_{p_0} - \tilde{G}_{p_0})^\Psi] \circ Q$ are non-zero, the product of the eigenvalues is $$\det([(G_{p_0} - \tilde{G}_{p_0})(G_{p_0} - \tilde{G}_{p_0})^\Psi] \circ Q) = M_t^{\Gamma M_t} \prod_{k=1}^{\Gamma M_t} |x_k - \tilde{x}_k|^2 \cdot \quad (34)$$

$$\det((I_{M_t} \otimes 1_{\Gamma \times \Gamma}) \circ Q)$$

$$= M_t^{\Gamma M_t} \prod_{k=1}^{\Gamma M_t} |x_k - \tilde{x}_k|^2 \cdot$$

$$\det(Q_0))^{M_t},$$

where $Q_0 = \{q_{i,j}\}$, $1 \leq i,j \leq \Gamma$ and $q_{i,j}$ is specified in (31). Similar to the correlation matrix R in (24), $Q_0$ can also be expressed as $$Q_0 = W_0 \operatorname{diag}(\delta_0^2, \delta_1^2, \ldots, \delta_{L-1}^2) W_0^\Psi, \text{ where} \quad (35)$$

$$W_0 = \begin{bmatrix} 1 & 1 & \cdots & 1 \\ w^{\tau_0} & w^{\tau_1} & \cdots & w^{\tau_{L-1}} \\ \vdots & \vdots & \ddots & \vdots \\ w^{(\Gamma-1)\tau_0} & w^{(\Gamma-1)\tau_1} & \cdots & w^{(\Gamma-1)\tau_{L-1}} \end{bmatrix}_{\Gamma \times L}.$$

Clearly, with $\tau_0 < \tau_1 < \ldots < \tau_{L-1}$, $Q_0$ is nonsingular. Therefore, from (34), it can be observed that if $\prod_{k=1}^{\Gamma M_t} |x_k - \tilde{x}_k| \neq 0$, the determinant of $[(G_{p_0} - \tilde{G}_{p_0})(G_{p_0} - \tilde{G}_{p_0})^\Psi] \circ Q$ is non-zero. This implies that the SF code achieves a diversity order of $\Gamma M_t M_r$.

The assumption of $G_p = \tilde{G}_p$ for any $p \neq p_0$ is also sufficient to calculate the diversity product defined in (27). If the rank of $\Delta \circ R$ is $\Gamma M_t$ and $G_p \neq \tilde{G}_p$ for some $p \neq p_0$, the product of the non-zero eigenvalues of $\Delta \circ R$ should be not less than that with the assumption of $G_p = \tilde{G}_p$ for any $p \neq p_0$. Specifically, the diversity product can be calculated as $$\zeta = \frac{1}{2\sqrt{M_t}} \min_{G_{P_0} \neq \tilde{G}_{P_0}} |det([(G_{P_0} - \tilde{G}_{P_0})(G_{P_0} - \tilde{G}_{P_0})^\Psi] \circ Q)|^{\frac{1}{2\Gamma M_t}} \quad (36)$$

$$= \frac{1}{2} \min_{X \neq \tilde{X}} \left( \prod_{k=1}^{\Gamma M_t} |x_k - \tilde{x}_k| \right)^{\frac{1}{\Gamma M_t}} |det(Q_0)|^{\frac{1}{2\Gamma}}$$

$$= \zeta_{in} \cdot |det(Q_0)|^{\frac{1}{2\Gamma}} \text{ and}$$

$$\zeta_{in} = \frac{1}{2} \min_{X \neq \tilde{X}} \left( \sum_{k=1}^{\Gamma M_t} |x_k - \tilde{x}_k| \right)^{\frac{1}{\Gamma M_t}} \quad (37)$$

is termed the "intrinsic" diversity product of the SF code and is independent of the power delay profile of the channel.

Thus, in accordance with fundamental aspects of the invention, the following holds: For any SF code constructed by (28) and (29), if $\Pi_{k=1}^{\Gamma M_t} |x_k - \tilde{x}_k| \neq 0$, for any pair of distinct sets of symbols $X = [x_1 \ x_2 \ \ldots \ x_{\Gamma M_t}]$ and $\tilde{X} = [\tilde{x}_1 \ \tilde{x}_2 \ \tilde{x}_{\Gamma M_t}]$ the SF code achieves a diversity order of $\Gamma M_t M_r$, and a diversity product as given by (36).

It is to be noted that $|det(Q_0)|$ depends only on the power delay profile of the channel, and the intrinsic diversity product $\zeta_{in}$ depends only on $\min_{X \neq \tilde{X}} (\Pi_{k=1}^{\Gamma M_t} |x_k - \tilde{x}_k|)^{1/(\Gamma M_t)}$, which is called the minimum product distance of the set of symbols $X = [x_1 \ x_2 \ \ldots \ X_{\Gamma M_t}]$. Therefore, given the code structure (29), it is desirable to design the set of symbols X such that the minimum product distance is as large as possible. The problem of maximizing the minimum product distance of a set of signal points as the solution to the problem of constructing signal constellations for Rayleigh fading channels is well-known. Two exemplary design methodologies to establish the set of variables $X = [x_1 \ x_2 \ \ldots \ x_{\Gamma M_t}]$ will now be discussed. A change notation, $K = \Gamma M_t$, will simplify the discussion.

In a first exemplary design approach, the signal points $X = [x_1 x_2 \ldots x_K]$ are transformed over a K-dimensional signal set. Specifically, assume that $\Omega$ is a set of signal points, such as a constellation known to those in the art (QAM, PAM, etc). For any signal vector $S = [s_1 \ s_2 \ \ldots \ s_K] \in \Omega^K$, let $$X = SM_K, \quad (38)$$

where $M_K$ is K×K matrix. For a given signal constellation $\Omega$, the transform $M_K$ should be optimized such that the minimum product distance of the set of X vectors is as large as possible. Both Hadamard transforms and Vandermonde matrices may be utilized for constructing $M_K$, however the transforms $M_K$ based on Vandermonde matrices result in larger minimum product distance than those based on Hadamard transforms.

To illustrate these aspects of the invention, an exemplary transform $M_K$ based on Vandermonde matrices will be presently described. Recall that a Vandermonde matrix with variables $\theta_1, \theta_2, \ldots \theta_K$ is a K×K matrix $$V(\theta_1, \theta_2, \ldots, \theta_K) \triangleq \begin{bmatrix} 1 & 1 & \cdots & 1 \\ \theta_1 & \theta_2 & \cdots & \theta_K \\ \vdots & \vdots & \cdots & \vdots \\ \theta_1^{K-1} & \theta_2^{K-1} & \cdots & \theta_K^{K-1} \end{bmatrix}. \quad (39)$$

In a first exemplary class of transforms, $K = 2^s$, $(s \geq 1)$ and the optimum transform $M_K$ for a signal constellation from $Z[j] \triangleq \{a + jb: \text{both a and b are integers}, j = \sqrt{-1}\}$ is given by $$M_K = \frac{1}{\sqrt{K}} V(\theta_1, \theta_2, \ldots, \theta_K), \quad (40)$$

where $\theta_1, \theta_2, \theta_K$ are the roots of the polynomial $\theta^K - j$ over field $Q[j] \triangleq \{c+dj: \text{both c and d are rational numbers}\}$, and they can be determined as $$\theta_k = e^{j\frac{4k-3}{2K}\pi}, k = 1, 2, \ldots, K. \quad (41)$$

In another exemplary class, $K = 3 \cdot 2^s$, $(s \geq 0)$, and the optimum transform $M_K$ for a signal constellation $\Omega$ from $Z[\omega] \triangleq \{a+b\omega: \text{both a and b are integers}, \omega = (-1+j\sqrt{3}/2)\}$ is given by $$M_K = \frac{1}{\sqrt{K}} V(\theta_1, \theta_2, \ldots, \theta_K), \quad (42)$$

where $\theta_1, \theta_2, \ldots \theta_K$ are the roots of the polynomial $\theta^K + \omega$ over field $Q[\omega] \triangleq \{c+d\omega: \text{both c and d are rational numbers}\}$, and they are specified as $$\theta_k = e^{j\frac{6k-1}{3K}\pi}, k = 1, 2, \ldots, K. \quad (43)$$

The signal constellations $\Omega$ from $Z[j]$ are of practical interest. In the case where $K = 2^s$, $(s \geq 1)$, optimum transforms (40) and (41) have been described in the prior art literature. Other transforms $M_K$ (not optimum) are known where K is not a power of two. If $K = 2^s \cdot 3^t$ $(s \geq 1, t \geq 1)$, for example, a class of transforms $M_K$ for signal constellations $\Omega$ from $Z[j]$ has been given as $$M_K = \frac{1}{\sqrt{K}} V(\theta_1, \theta_2, \ldots, \theta_K), \text{ where} \quad (44)$$

$$\theta_k = e^{j\frac{6k-5}{3K}\pi}, k = 1, 2, \ldots, K.$$

Additionally, optimum transforms $M_K$ are known where K is not a power of two. For example, if K is not a power of two, but $K = \phi(J)$ for some J with $J \neq 0 \pmod 4$, where $\phi(\cdot)$ is the Euler function ($\phi(J)$ denotes the number of integers m, $(1 \leq m \leq J)$ such that m is relatively prime to J, i.e., $\gcd(m, J) = 1$), the optimum transform $M_K$ for a signal constellation $\Omega$ from $Z[j]$ can be expressed as $$M_K = \frac{1}{\sqrt{K}} V(\theta_1, \theta_2, \ldots, \theta_K) \text{ where} \quad (45)$$

$$\theta_k = e^{j\frac{2m_k}{J}\pi},$$

$$\gcd(m_k, J) = 1, \quad i \leq m_k < J.$$

For example, when K is 6, 10, 12, 18, the corresponding J is 7, 11, 13, 19, respectively. In these cases, $\theta_k = e^{j2k\pi/J}$ $$\theta_k = e^{j\frac{2k}{J}\pi}, \quad k = 1, 2, \cdots, J-1.$$

In case of some odd K, for example K=5, 7, 9, and so on, it has been shown that:

$$M_K = \frac{1}{\sqrt{\gamma}} V(\theta_1, \theta_2, \ldots, \theta_K), \tag{46}$$

where $\theta_1, \theta_2, \ldots, \theta_K$ are the roots of polynomial $\theta^K - (1+j)$ over the field Q[j], and can be calculated as $$\theta_k = 2^{\frac{1}{2K}} e^{j\frac{8k-7}{4K}\pi}, \quad k = 1, 2, \ldots, K. \tag{47}$$

In (46), the factor $\gamma$ is equal to $\sqrt{(2^{1/K}-1)/K}$ for the energy normalization. Note that although the transforms given in (44) and (47) are not optimum, they do provide large minimum product distance.

In another approach to designing the signal set X, the structure of the diagonal space-time block codes is exploited. Suppose that the spectral efficiency of the SF code is r bits/s/Hz. The set of $L_0=2^{rK}$ variables may then be directly designed under the energy constraint $E\|X\|_F^2=K$. For example, if diagonal space-time block codes may be constructed as follows:

$$C_l = \text{diag}(e^{ju_1\theta_l}, e^{ju_2\theta_l}, \ldots, e^{ju_K\theta_l}), \quad l=0, 1, \ldots, L_0-1, \tag{48}$$

where $$\theta_l = \frac{l}{L_0} 2\pi, \quad 0 \leq l \leq L_0 - 1,$$

and $u_1, u_2, \ldots, u_K \in \{0, 1, \ldots, L_0-1\}$. The parameters $u_1, u_2, \ldots, u_K$ are to be optimized such that the metric $$\min_{l \neq l'} \prod_{k=1}^{K} |e^{ju_k\theta_l} - e^{ju_k\theta_{l'}}| = \min_{1 \leq l \leq L_0-1} \prod_{k=1}^{K} \left|2\sin\left(\frac{u_k l}{L_0}\pi\right)\right| \tag{49}$$

is maximized. A set of variables $X=[x_1\ x_2\ \ldots\ x_K]$ may be constructed as follows: For any $l=0, 1, \ldots, L_0-1$, let $$x_k = e^{ju_k\theta_l}, k=1, 2, \ldots, K. \tag{50}$$

Then, the minimum product distance of the set of the resulting signal vectors X may determined by the metric in (49). The optimum parameters $u=[u_1\ u_2\ \ldots\ u_K]$ can be obtained via computer search. For example,

| | | |
|---|---|---|
| K = 4, | $L_0$ = 16, | u = [1 3 5 7]; |
| K = 4, | $L_0$ = 256, | u = [1 25 97 107]; |
| K = 6, | $L_0$ = 64, | u = [1 9 15 17 23 25]; |
| K = 6, | $L_0$ = 1024, | u = [1 55 149 327 395 417]; . . . . |

In the previous discussion, a class of SF codes with full rate and full diversity was obtained under the assumption that the transmitter has no a priori knowledge about the channel. If channel information were available to the transmitter, aspects of the invention may bring into effect improved performance of the SF codes. For example, the correlation between adjacent subcarriers may be reduced by random interleaving of the transmitted symbols. Additionally, if the power delay profile of the channel is available to the transmitter, further improvement can be achieved through a data permutation (or interleaving) method that explicitly takes the power delay profile into account.

4. Maximizing the Coding Advantage of SF Codes by Permutation

Suppose that the path delays $\tau_0, \tau_1\ \tau_{L-1}$ and signal powers $\theta_0^2, \theta_1^2, \theta_{L-1}^2$ are available to the transmitter. With this knowledge, the present invention provides an optimum permutation (or interleaving) method for the SF codes defined by (28) and (29) such that the resulting coding advantage is maximized. By permuting the rows of a SF codeword C, an interleaved codeword $\sigma(c)$ is obtained.

Figure 3:
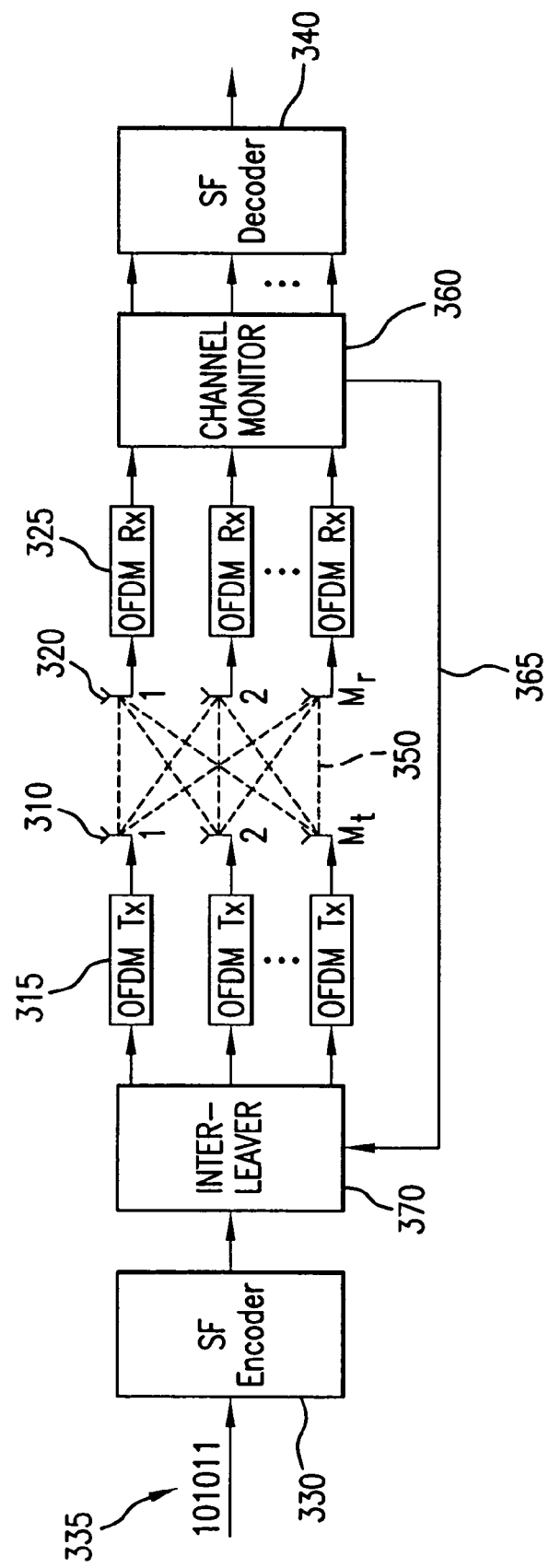
FIG. 3 is a schematic block diagram illustrating yet another exemplary embodiment of an apparatus operable in accordance with the present invention.

An exemplary system for carrying out the permutations to be presently described is illustrated in FIG. 3. As with the exemplary systems previously described, the transmitter is configured with $M_t$ transmit antennas and OFDM Tx processors 315, whose functions correspond with like elements in previously described embodiments. The SF encoder 330 performs the SF encoding on bitstream 335 as described above. The receiver is configured with $M_r$ receive antennas 325 and OFDM Rx processors 325, which operate as described above. The SF decoder 340 performs the decoding operation at the receiving end.

The receive antennas 320 are coupled to channel monitor 360, which performs analysis on the incoming transmission to extract characteristic data from each transmission channel 350. The channel characteristics may include symbol delay information as well as an indication of received power. The characteristic information is provided to interleaver 370 at the transmitter through feedback path 365. The interleaver 370 permutes the codeword as prescribed by the channel characteristics, as will be described in paragraphs that follow. It should be noted that while the exemplary channel characteristic acquisition mechanism of FIG. 3 is shown in a feedback configuration, other configurations are possible and within the scope of the present invention.

As stated previously, for two distinct SF codewords C and $\tilde{C}$ constructed from $G_1, G_2, \ldots, G_p$ and $\tilde{G}_1, \tilde{G}_2, \ldots, \tilde{G}_p$ respectively, there exists at least one index $p_0 (1 \leq p_0 \leq P)$ such that $G_{p_0} \neq \tilde{G}_{p_0}$. In order to determine the minimum rank of $[\sigma(C-\tilde{C})\sigma(C-\tilde{C})^\Psi] \circ R$, it is further assumed that $G_p = \tilde{G}_p$ for any $p \neq p_0$ for the same reason as stated above.

Suppose that $G_{p_0}$ and $\tilde{G}_{p_0}$ consist of symbols $X=[x_1\ x_2\ \ldots\ x_{\Gamma M_t}]$ and $\tilde{X}=[\tilde{x}_1\ \tilde{x}_2\ \ldots\ \tilde{x}_{\Gamma M_t}]$, respectively, with $x_k \neq \tilde{x}_k$ for all $1 \leq k \leq \Gamma M_t$. For simplicity, we use the notation $\Delta x_k = x_k - \tilde{x}_k$ for $k=1, 2, \ldots, \Gamma M_t$. In certain embodiments of the invention, the k-th, ($1 \leq k \leq \Gamma M_t$) row of $G_{p_0} - \tilde{G}_{p_0}$ is relocated to the n-th, $(0 \leq n_k \leq N-1)$ row of $\sigma(C-\tilde{C})$, i.e., the k-th row of $G_{p_0}$ will be transmitted at the $n_k$-th subcarrier. Then, all the $(n_{(m-1)\Gamma+i}, n_{(m-1)\Gamma+j})$-th entries of $\sigma(C-\tilde{C})\sigma(C-\tilde{C})^\Psi$, $1 \leq i,j \leq \Gamma$ and $1 \leq m \leq M_r$, are zero and the other entries are zero. Thus, all the entries of $[\sigma(C-\tilde{C})\sigma(C-\tilde{C})^\Psi] \circ R$ are zeros, except for $(n_{(m-1)\Gamma+i}, n_{(m-1)\Gamma+j})$-th entries for $1 \leq i,j \leq \Gamma$ and $1 \leq m \leq M_r$. Define, now, the matrices $A_m$, m=1, 2, \ldots, $M_t$, such that the (i,j)-th, ($1 \leq i,j \leq \Gamma$), entry of $A_m$ is the $(n_{(m-1)\Gamma+i}, n_{(m-1)r+j})$-th entry of $[\sigma(C-\tilde{C})\sigma(C-\tilde{C})^\Psi]\circ R$. Since the correlation matrix R is a Toeplitz matrix, the (i,j)-th, $1\leq i, j \leq \Gamma$, entry of $A_m$ can be expressed as $$M_t \Delta x_q \Delta x_r^* \sum_{l=0}^{L-1} \delta_l^2 \omega^{(n_q - n_r)\tau_l}, \tag{51}$$

where $q=(m-1)\Gamma+i$ and $r=(m-1)\Gamma+j$. Note that the non-zero eigenvalues of $[\sigma(C-\tilde{C})(C-\tilde{C})^\Psi]\circ R$ are determined by the matrices $A_m$, $m=1, 2, \ldots, M_t$. The product of the non-zero eigenvalues of $[\sigma(C-\tilde{C})\sigma(C-\tilde{C})^\Psi]\circ R$. $\lambda_1, \lambda_2, \ldots, \lambda_{\Gamma M_t}$, can be calculated as $$\prod_{k=1}^{\Gamma M_t} \lambda_k = \prod_{m=1}^{M_t} |\det(A_m)|. \tag{52}$$

From (51), for each $m=1, 2, \ldots, M_t$, the $\Gamma \times \Gamma$ matrix $A_m$ can be decomposed as follows:

$$A_m = D_m W_m \Lambda W_m^\Psi D_m^\Psi, \text{ where} \tag{53}$$

where $$\Lambda = \text{diag}(\delta_0^2, \delta_1^2, \ldots, \delta_{L-1}^2), \tag{54}$$

$$D_m = \sqrt{M_t}\, \text{diag}\,(\Delta x_{(m-1)\Gamma+1}, \Delta x_{(m-1)\Gamma+2}, \ldots, \Delta x_{m\Gamma}),$$

$$W_m = \begin{bmatrix} \omega^{n_{(m-1)\Gamma+1}\tau_0} & \omega^{n_{(m-1)\Gamma+1}\tau_1} & \cdots & \omega^{n_{(m-1)\Gamma+1}\tau_{L-1}} \\ \omega^{n_{(m-1)\Gamma+2}\tau_0} & \omega^{n_{(m-1)\Gamma+2}\tau_1} & \cdots & \omega^{n_{(m-1)\Gamma+2}\tau_{L-1}} \\ \vdots & \vdots & \ddots & \vdots \\ \omega^{n_{m\Gamma}\tau_0} & \omega^{n_{m\Gamma}\tau_0} & \cdots & \omega^{n_{m\Gamma}\tau_{L-1}} \end{bmatrix}.$$

As a consequence, the determinant of $A_m$ is given by $$\det(A_m) = M_t^\Gamma \prod_{i=1}^{\Gamma} |\Delta x_{(m-1)\Gamma+i}|^2 \det(W_n \Lambda W_m^\Psi). \tag{55}$$

Substituting (55) into (52), the expression for the product of the non-zero eigenvalues of $[\sigma(C-\tilde{C})\sigma(C-\tilde{C})\Psi]\circ R$ takes the form $$\prod_{k=1}^{\Gamma M_t} \lambda_k = M_t^{\Gamma M_t} \prod_{k=1}^{\Gamma M_t} |\Delta x_k|^2 \prod_{m=1}^{M_t} |\det(W_m \Lambda W_m^\Psi)|. \tag{56}$$

Therefore, the diversity product of the permuted SF code can be calculated as $$\zeta = \frac{1}{2} \min_{X \neq \tilde{X}} \left( \prod_{k=1}^{\Gamma M_t} |\Delta x_k| \right)^{\frac{1}{\Gamma M_t}} \left( \prod_{m=1}^{M_t} |\det(W_m \Lambda W_m^\Psi)| \right)^{\frac{1}{2\Gamma M_t}} = \zeta_{in} \cdot \zeta_{ex}, \tag{57}$$

where $\zeta_{in}$ is the intrinsic diversity product defined in (37), and $\zeta_{ex}$ is the "extrinsic" diversity product, is defined by $$\zeta_{ex} = \left( \prod_{m=1}^{M_t} |\det(W_m \Lambda W_m^\Psi)| \right)^{\frac{1}{2\Gamma M_t}}. \tag{58}$$

The extrinsic diversity product $\zeta_{ex}$ depends only on the permutation and the power delay profile of the channel. The permutation does not affect the intrinsic diversity product $\zeta_{in}$.

From (54), for each $m=1, 2, \ldots, M_t$, $W_m$ can be written as $$W_m = V_m \cdot \text{diag}(\omega^{n_{(m-1)\Gamma+1}\tau_0}, \omega^{n_{(m-1)\Gamma+1}\tau_1}, \ldots, \omega^{n_{(m-1)\Gamma+1}\tau_{L-1}}), \tag{59}$$

where $$V_m = \begin{bmatrix} 1 & 1 & \cdots & 1 \\ \omega^{[n_{(m-1)\Gamma+2}-n_{(m-1)\Gamma+1}]\tau_0} & \omega^{[n_{(m-1)\Gamma+2}-n_{(m-1)\Gamma+1}]\tau_1} & \cdots & \omega^{[n_{(m-1)\Gamma+2}-n_{(m-1)\Gamma+1}]\tau_{L-1}} \\ \vdots & \vdots & \ddots & \vdots \\ \omega^{[n_{m\Gamma}-n_{(m-1)\Gamma+1}]\tau_0} & \omega^{[n_{m\Gamma}-n_{(m-1)\Gamma+1}]\tau_1} & \cdots & \omega^{[n_{m\Gamma}-n_{(m-1)\Gamma+1}]\tau_{L-1}} \end{bmatrix}. \tag{60}$$

Thus, $\det(W_m \Lambda W_m^\Psi) = \det(V_m \Lambda V_m^\Psi)$. It is to be observed that the determinant of $W_m \Lambda W_m^\Psi$ depends only on the relative positions of the permuted rows with respect to the position $n_{(m-1)\Gamma+1}$, not on their absolute positions.

Thus, another fundamental aspect of the present invention is revealed. For any subcarrier permutation, the diversity product of the resulting SF code is $$\zeta = \zeta_{in} \cdot \zeta_{ex} \tag{61}$$

where $\zeta_{in}$ and $\zeta_{ex}$ are the "intrinsic" and "extrinsic" diversity products defined in (37) and (58), respectively. Moreover, the extrinsic diversity product $\zeta_{ex}$ is upper bounded as: (i) $\zeta_{ex} \leq 1$; and more precisely, (ii) if the power profile $\delta_0, \delta_1, \ldots, \delta_{L-1}$ is sorted in a non-increasing order as: $\delta_{l_1} \geq \delta_{l_2} \geq \ldots \geq \delta_{l_L}$ then $$\zeta_{ex} \leq \left(\prod_{i=1}^{\Gamma} \delta_{l_i}\right)^{\frac{1}{\Gamma}} \left|\prod_{m=1}^{M_t} \det(V_m V_m^{\Psi})\right|^{\frac{1}{2\Gamma M_t}}, \qquad (62)$$

where equality holds when $\Gamma = L$. As a consequence, $$\zeta_{ex} \leq \sqrt{L} \left(\prod_{i=1}^{\Gamma} \delta_{l_i}\right)^{\frac{1}{\Gamma}}. \qquad (63)$$

It is to be observed from the discussion above that the extrinsic diversity product $\zeta_{ex}$ depends on the power delay profile in two ways. First, it depends on the power distribution through the square root of the geometric average of the largest $\Gamma$ path powers, i.e., $(\Pi_{i=1}^{\Gamma} \delta_{l_i})^{1/\Gamma}$. In case of $\Gamma = L$, the best performance is expected if the power distribution is uniform (i.e., $\delta_l^2 = 1/L$), since the sum of the path powers is unity. Second, the extrinsic diversity product $\zeta_{ex}$ also depends on the delay distribution and the applied subcarrier permutation. On the other hand, the intrinsic diversity product, $\zeta_{in}$, is not effected by the power delay profile or the permutation method. It only depends on the signal constellation and the SF code design via the achieved minimum product distance.

By carefully choosing the applied permutation method, the extrinsic diversity product $\zeta_{ex}$ may be increased so as to improve the overall performance of the SF code. Toward this end, certain embodiments of the invention may employ any of the following exemplary permutation strategies.

In certain embodiments of the invention, an integer $n (0 \leq n \leq N-1)$ is decomposed into $$n = e_1 \Gamma + e_0, \qquad (64)$$

where $0 \leq e_0 \leq \Gamma - 1$, $$e_1 = \left\lfloor \frac{n}{\Gamma} \right\rfloor,$$

and $\lfloor x \rfloor$ denotes the largest integer not greater than x. For a fixed integer $\mu$, $(\mu \geq 1)$, $e_1$ in (64) is itself decomposed into $$e_1 = v_1 \mu + v_0, \qquad (65)$$

where $0 \leq v_0 \leq \mu - 1$ and $$v_1 = \left\lfloor \frac{e_1}{\mu} \right\rfloor.$$

The rows of the $N \times M_t$ SF codeword constructed in accordance with (28) and (29) are permuted in such a way that the n-th $(0 \leq n \leq N-1)$ row of C is moved to the $\sigma(n)$-th row, where $$\sigma(n) = v_1 \mu \Gamma + e_0 \mu + v_0, \qquad (66)$$

where $e_0, v_0, v_1$ are defined in (64) and (65). The integer $\mu$ is referred to as the separation factor, and should be chosen such that $\sigma(n) \leq N$ for any $0 \leq n \leq N-1$, or equivalently, $$\mu \leq \left\lfloor \frac{N}{\Gamma} \right\rfloor.$$

Moreover, in order to guarantee that the mapping (66) is one-to-one over the set $\{0, 1, \ldots, N-1\}$ (i.e., it defines a permutation), $\mu$ must be a factor of N. The role of the permutation specified in (66) is to separate two neighboring rows of C by $\mu$ subcarriers.

The following result characterizes the extrinsic diversity product of the SF code that is permuted with the above described method. For the permutation specified in (66) with a separation factor $\mu$, the extrinsic diversity product of the permuted SF code is $$\zeta_{ex} = |\det(V_0 \Lambda V_0^{\Psi})|^{\frac{1}{2\Gamma}}, \text{ where} \qquad (67)$$

$$V_0 = \begin{bmatrix} 1 & 1 & \cdots & 1 \\ \omega^{\mu \tau_0} & \omega^{\mu \tau_1} & \cdots & \omega^{\mu \tau_{L-1}} \\ \omega^{2\mu \tau_0} & \omega^{2\mu \tau_1} & \cdots & \omega^{2\mu \tau_{L-1}} \\ \vdots & \vdots & \ddots & \vdots \\ \omega^{(\Gamma-1)\mu \tau_0} & \omega^{(\Gamma-1)\mu \tau_1} & \cdots & \omega^{(\Gamma-1)\mu \tau_{L-1}} \end{bmatrix}_{\Gamma \times L} \qquad (68)$$

Moreover, if $\Gamma = L$, the extrinsic diversity product $\zeta_{ex}$ can be calculated as $$\zeta_{ex} = \left(\prod_{l=0}^{L-1} \delta_l\right)^{\frac{1}{L}} \left(\prod_{0 \leq l_1 < l_2 \leq L-1} \left|2 \sin\left(\frac{\mu(\tau_{l_2} - \tau_{l_1})\pi}{T}\right)\right|\right)^{\frac{1}{L}}. \qquad (69)$$

The permutation (66) is determined by the separation factor $\mu$. Among the objectives of the invention is to find a separation factor $\mu_{op}$ that maximizes the extrinsic diversity product $\zeta_{ex}$:

$$\mu_{op} = \arg \max_{1 \leq \mu \leq \lfloor N/\Gamma \rfloor} |\det(V_0 \Lambda V_0^{\Psi})|. \qquad (70)$$

If $\Gamma = L$, the optimum separation factor $\mu_{op}$ can be expressed as $$\mu_{op} = \arg \max_{1 \leq \mu \leq \lfloor N/\Gamma \rfloor} \prod_{0 \leq l_1 < l_2 \leq L-1} \left|\sin\left(\frac{\mu(\tau_{l_2} - \tau_{l_1})\pi}{T}\right)\right|, \qquad (71)$$

which is independent of the signal power along individual paths. The optimum separation factor can be easily found via, for example, a low complexity computer search. However, in certain cases, closed form solutions can also be obtained. For example, if $\Gamma = L = 2$, the extrinsic diversity product $\zeta_{ex}$ is $$\zeta_{ex} = \sqrt{\delta_0 \delta_1} \left|2 \sin\left(\frac{\mu(\tau_1 - \tau_0)\pi}{T}\right)\right|^{\frac{1}{2}}. \qquad (72)$$

To illustrate, consider an exemplary embodiment of the invention having N=128 subcarriers, and a total bandwidth of BW=1 MHz. Then, the OFDM block duration is T=128 μs without the cyclic prefix. If $\tau_1-\tau_0=5$ μs, then $\mu_{op}=64$ and $\zeta_{ex}=\sqrt{2\delta_0\delta_1}$. If $\tau_1-\tau_0=20$ μs then $\mu_{op}=16$ and $\zeta_{ex}=\sqrt{2\delta_0\delta_1}$. In general, if $\tau_1-\tau_0=2^a b$ μs, where a is an non-negative integer and b is an odd integer, $\mu_{op}=128/2^{a+1}$, and the extrinsic diversity product is $\zeta_{ex}\sqrt{2\delta_0\delta_1}$, which achieves the upper bound (58) of the diversity product (61).

As a further example of a closed form determination of the optimum separation factor, assume that $\tau_l-\tau_0=lN_0T/N$, $l=1, 2, \ldots, L-1$ and N is an integer multiple of $LN_0$, where $N_0$ is a constant and not necessarily an integer. If $\Gamma=L$ or $\delta_0^2=\delta_1^2=\ldots=\delta_{L-1}^2=1/L$, the optimum separation factor is $$\mu_{op} = \frac{N}{LN_0}, \quad (73)$$

and the corresponding extrinsic diversity product is $\zeta_{ex}=\sqrt{L}(\Pi_{l=0}^{L-1}\delta_l)^{1/L}$. In particular, in the case where $\delta_0^2=\delta_1^2=\ldots=\delta_{L-1}^2=1/L$, $\zeta_{ex}=1$. In both cases, the upper bound of the extrinsic diversity products is achieved. Note that if $\tau_l=lT/N$ for $l=0, 1, \ldots, L-1$, $\Gamma=L$ and N is an integer multiple of L, the permutation with the optimum separation factor $\mu_{op}=N/L$ is similar to a known prior art optimum subcarrier grouping method, which, however, is not optimal for arbitrary power delay profiles.

As an illustrative example of the aspects of the invention described above, the optimum separation factors for two commonly used multipath fading models will now be determined. The COST 207 6-ray power delay profiles for typical urban (TU) and hilly terrain (HT) environment are described in Tables 1 and 2, respectively. Two different bandwidths are considered: a) BW=1 MHz, and b) BW=4 MHz. In the exemplary embodiment, the OFDM has N=128 subcarriers. The plots of the extrinsic diversity product $\zeta_{ex}$ as the function of the separation factor μ for the TU and HT channel models are shown in FIGS. 4A-4B and FIGS. 5A-5B, respectively. In each Figure, the curves of the extrinsic diversity product are depicted for different $\Gamma(2\leq\Gamma\leq L)$ values. Note that for a fixed $\Gamma$, $\Gamma=2, 3, \ldots, L$, the separation factor μ cannot be greater than $\lfloor N/\Gamma \rfloor$.

TABLE 1

Typical Urban (TU) 6 ray power delay profile

| Delay profile (μs) | 0.0 | 0.2 | 0.5 | 1.6 | 2.3 | 5.0 |
|---|---|---|---|---|---|---|
| Power profile | 0.189 | 0.379 | 0.239 | 0.095 | 0.061 | 0.037 |

TABLE 2

Hilly Terrain (HT) 6 ray power delay profile

| Delay profile (μs) | 0.0 | 0.1 | 0.3 | 0.5 | 15.0 | 17.2 |
|---|---|---|---|---|---|---|
| Power profile | 0.413 | 0.293 | 0.145 | 0.074 | 0.066 | 0.008 |

Figure 4A:
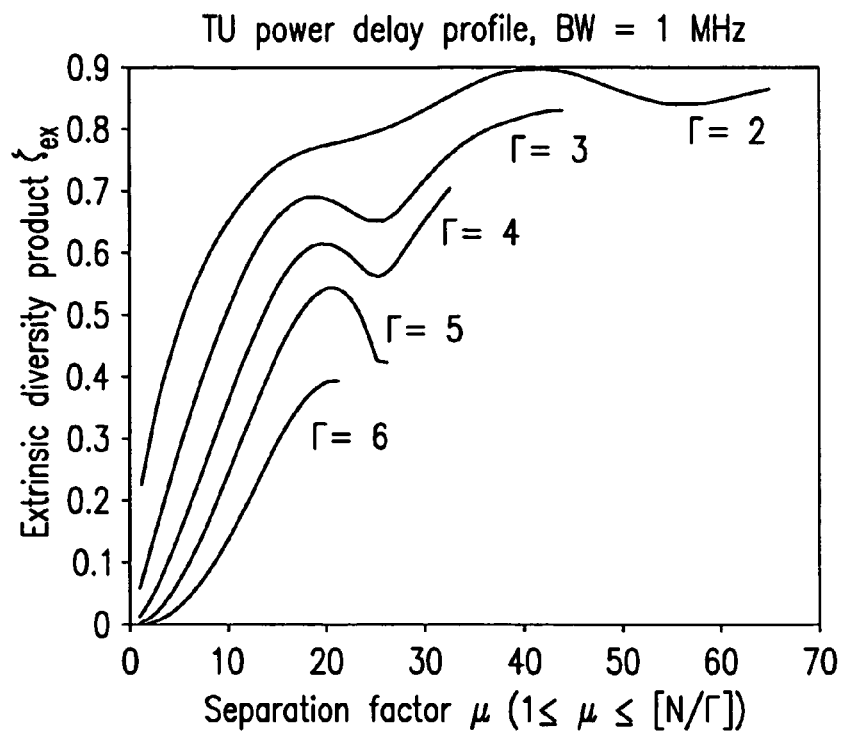
FIGS. 4A-4B are graphs depicting extrinsic diversity product of the present invention as a function of a separation factor for a typical urban power delay profile.
Figure 4B:
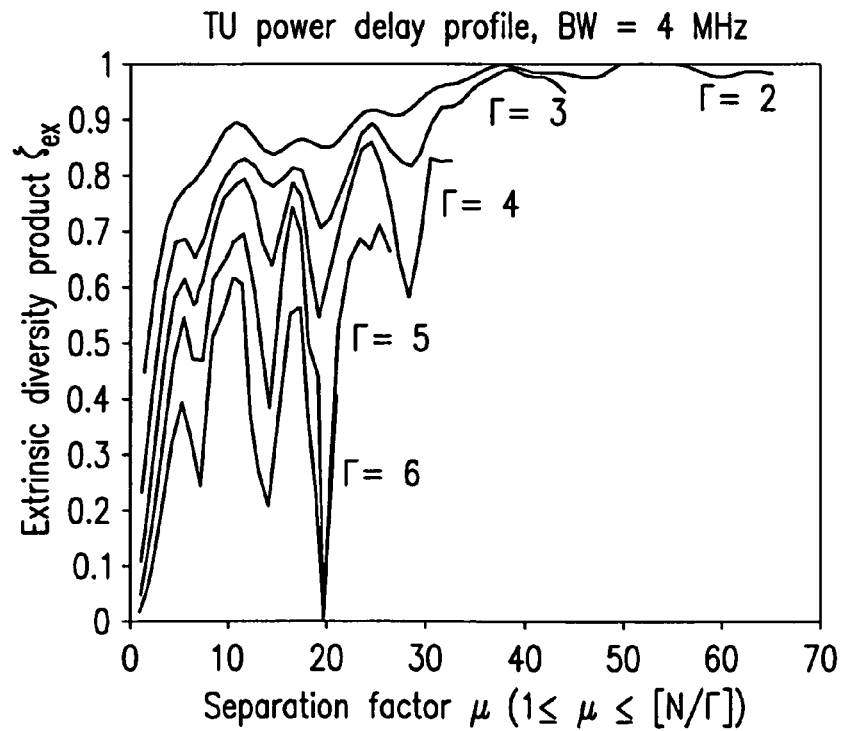

Referring to the $\Gamma=2$ case, there is shown in FIG. 4A the TU channel model with BW=1 MHz. As is shown in the Figure, the maximum extrinsic diversity product is $\zeta_{ex}=0.8963$. The corresponding separation factor is $\mu_{op}=40$. In such a case, however, μ=64 may be chosen so as to ensure one-to-one mapping, which results in an extrinsic diversity product $\zeta_{ex}=0.8606$. For the UT channel model with BW=4 MHz, as shown in FIG. 4B, the maximum extrinsic diversity product is $\zeta_{ex}=0.9998$, which approaches the unity upper bound. The corresponding separation factor is $\mu_{op}=51$. For similar reasons as in the previous case, μ=64 may be chosen to generate the appropriate permutation. The resulting extrinsic diversity product is $\zeta_{ex}=0.9751$, which is a slight performance loss compared to the maximum value $\zeta_{ex}=0.9998$.

Figure 5A:
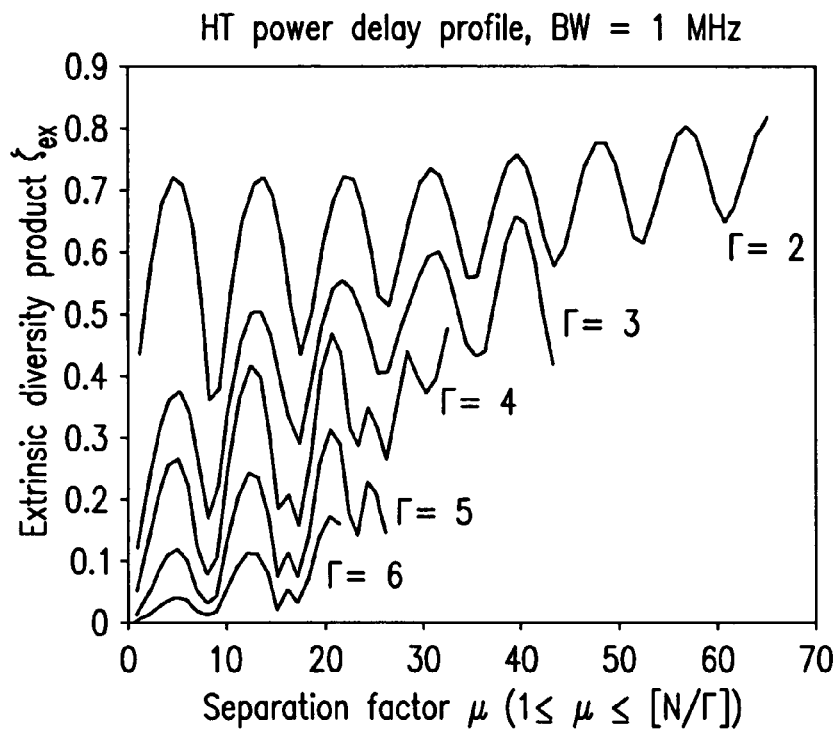
FIGS. 5A-5B are graphs depicting extrinsic diversity product of the present invention as a function of a separation factor for a hilly terrain power delay profile.
Figure 5B:
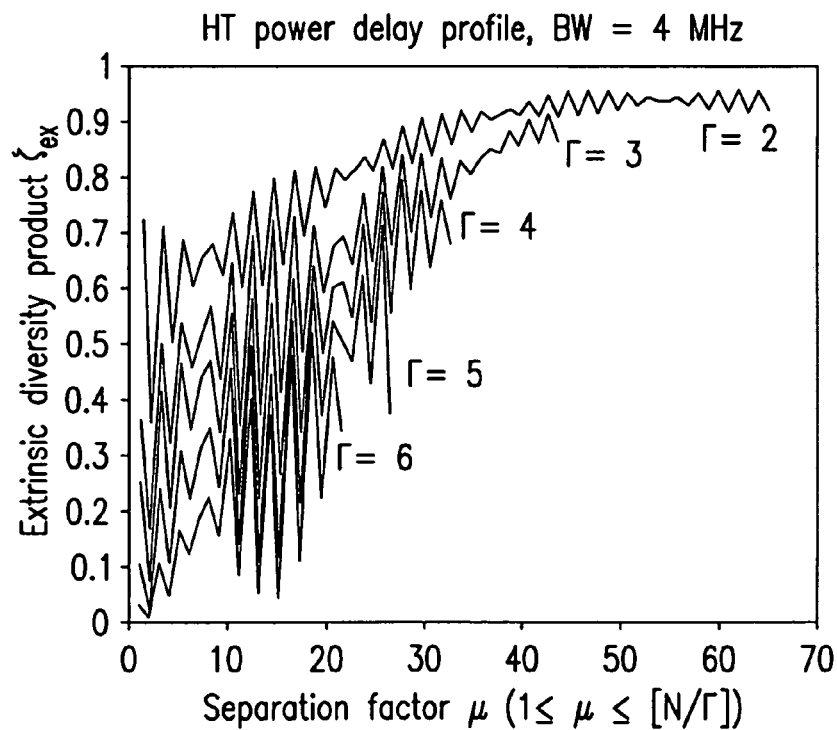

Referring to FIG. 5A, there is shown an illustrative example of a 6-ray HT channel model with BW=1 MHz. The maximum extrinsic diversity product, as is shown, is $\zeta_{ex}=0.8078$. The corresponding separation factor is $\mu_{op}=64$, which allows easy implementation of a permutation. For the HT channel model with BW=4 MHz, as shown in FIG. 5B, the maximum extrinsic diversity product is $\zeta_{ex}=0.9505$ and the corresponding separation factor is $\mu_{op}=46$. To ensure one-to-one mapping, μ=64 may be chosen, which results in an extrinsic diversity product $\zeta_{ex}=0.9114$.

To demonstrate aspects of the invention, consider a MIMO-OFDM system having $M_t=2$ transmit antennas, $M_r=1$ receive antenna and N=128 subcarriers. Full-rate full-diversity SF codes were constructed according to (28) and (29) with $\Gamma=2$, yielding the code block structure $$G = \sqrt{2}\begin{bmatrix} x_1 & 0 \\ x_2 & 0 \\ 0 & x_3 \\ 0 & x_4 \end{bmatrix}. \quad (74)$$

The symbols $x_1, x_2, x_3, x_4$ were obtained as $$[x_1 \; x_2 \; x_3 \; x_4] = [s_1 \; s_2 \; s_3 \; s_4] \cdot \frac{1}{2} V(\theta, -\theta, j\theta, -j\theta), \quad (75)$$

where $s_1, s_2, s_3, s_4$ were chosen from BPSK constellation ($s_i \in \{1,-1\}$) or QPSK constellation ($s_i \in \{\pm 1, \pm j\}$), $V(\cdot)$ is the Vandermonde matrix defined in (39), and $\theta=e^{j\pi/8}$. This code targets a frequency diversity order of $\Gamma=2$, thus it achieves full diversity only if the number of delay paths is $L\leq 2$.

The SF codes of the present invention were implemented with three permutation schemes: no permutation, random permutation, and the optimum permutation method of the present invention. The random permutation was generated by the known Takeshita-Constello method, which is given by $$\sigma(n) = \left(\frac{n(n+1)}{2}\right) \bmod N, n = 0, 1, \cdots, N-1. \quad (76)$$

The performance of the illustrative systems are presented herein in terms of average bit error rate (BER), and are shown in the Figures as functions of the average signal-to-noise ratio (SNR). In all of the illustrative results, the curves with squares, pluses and stars show the performance of the proposed full-rate full-diversity SF codes without permutation, with the random permutation (76) and with the inventive optimum permutation, respectively.

To compare the performance of the full-rate full-diversity SF coding schemes of the invention using different permutation schemes, the code (74) was implemented with the channel symbols $S_1, s_2, s_3, s_4$ chosen from BPSK constellation. The symbol rate of this code is 1, and its spectral efficiency is 1 bit/s/Hz, ignoring the cyclic prefix.

Figure 6A:
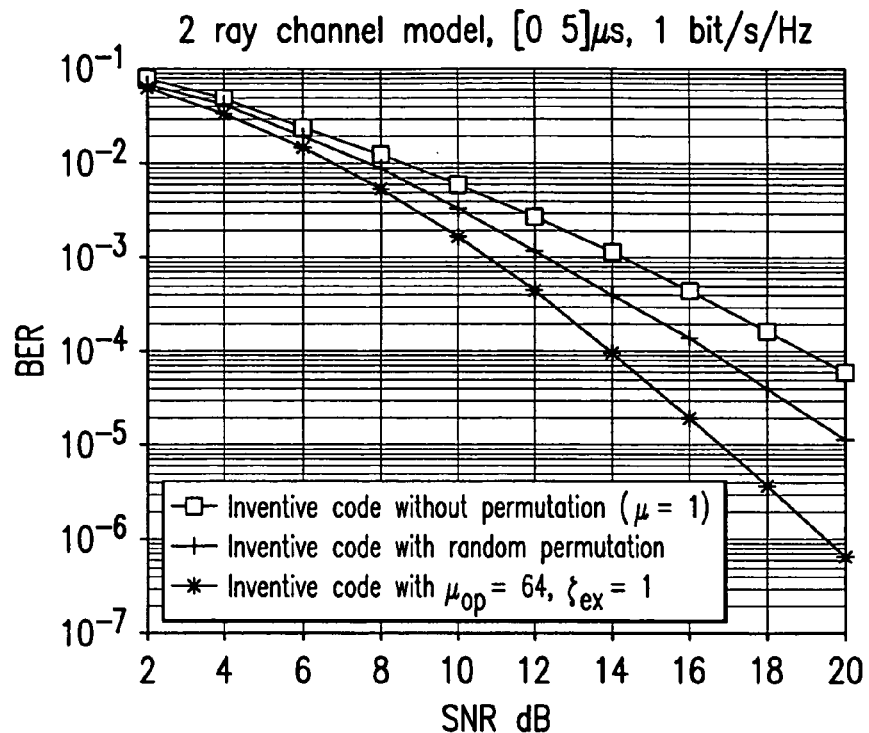
FIGS. 6A-6B are performance graphs of an exemplary space-frequency code of the present invention.
Figure 6B:
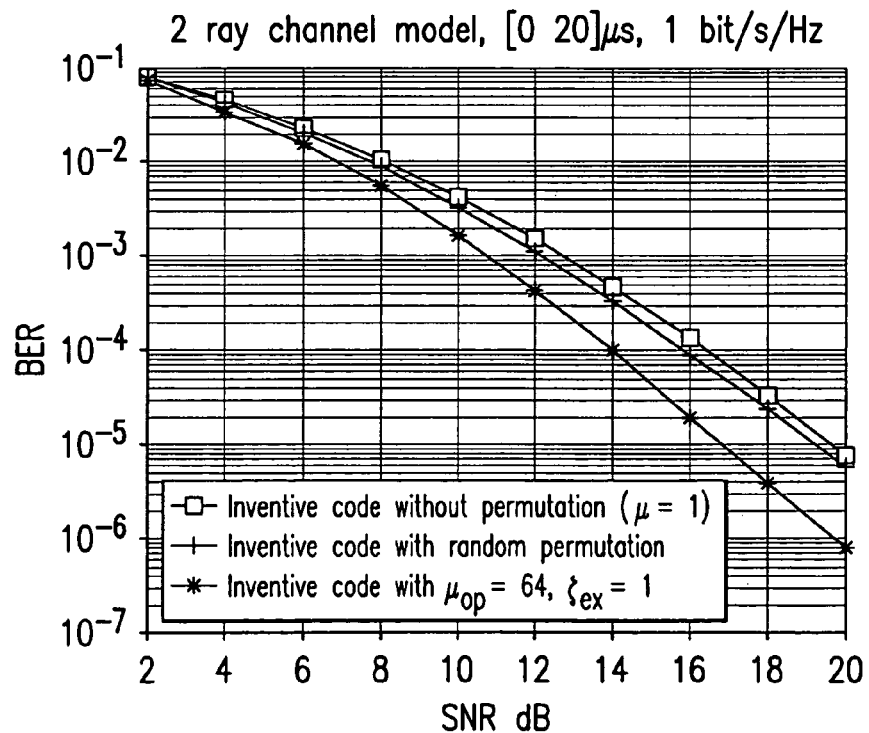

An illustrative system utilized a simple 2-ray, equal-power delay profile, with a delay τ μs between the two rays was respectively implemented in accordance with two cases: a) τ=5 μs, and b) τ=20 μs with OFDM bandwidth BW=1 MHz. From the BER curves, shown in FIG. 6A and FIG. 6B, it is observed that the performance of the proposed SF code with the random permutation is better than that without permutation. In case of τ=5 μs, the performance improvement is more significant. With the inventive optimum permutation, the performance is further improved. In case of τ=5 μs, there is a 3 dB gain between the optimum permutation of the present invention ($\mu_{op}$=64) and the random permutation at a BER of $10^{-5}$. In case of τ=20 μs, the performance improvement of the inventive optimum permutation ($\mu_{op}$=16) over the random permutation is about 2 dB at a BER of $10^{-5}$. If no permutation is used, the performance of the code in the τ=5 μs case ($\zeta_{ex}$=0.3499) is worse than that in the τ=20 μs case ($\zeta_{ex}$=0.6866). However, if the optimum permutation of the present invention is applied, the performance of the SF code in both the τ=5 μs case ($\mu_{op}$=64, $\zeta_{ex}$=1) and the τ=20 μs case ($\mu_{op}$=16, $\zeta_{ex}$=1) is approximately the same. This confirms that by careful design of an interleaver to perform the permutation, the performance of the SF codes can be significantly improved. What is also shown is that the extrinsic diversity product $\zeta_{ex}$ provides a good indicator of a particular code's performance.

Figure 7A:
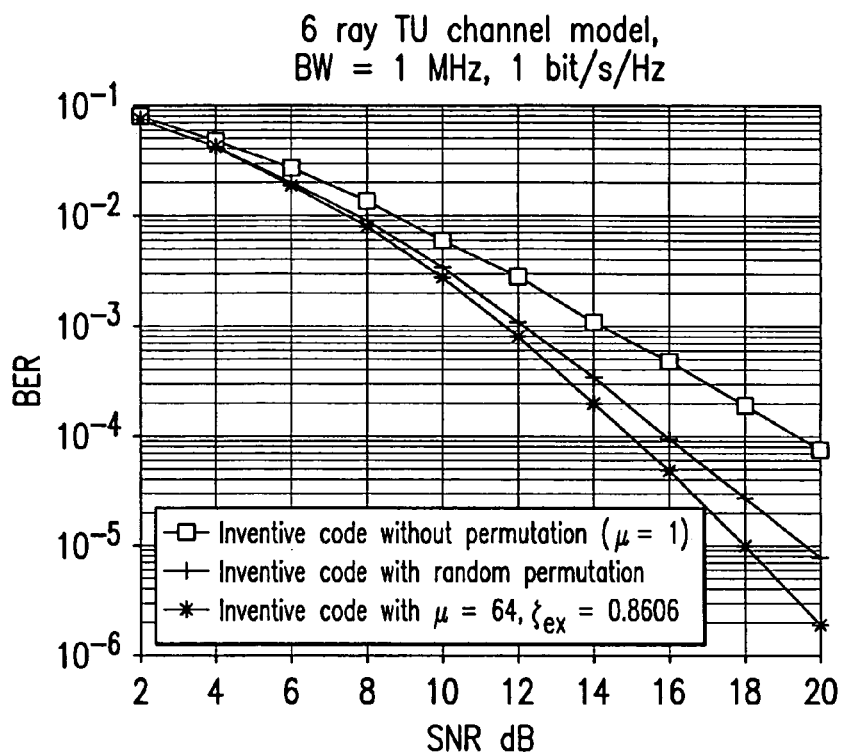
FIGS. 7A-7B are performance graphs of an exemplary space-frequency code of the present invention.
Figure 7B:
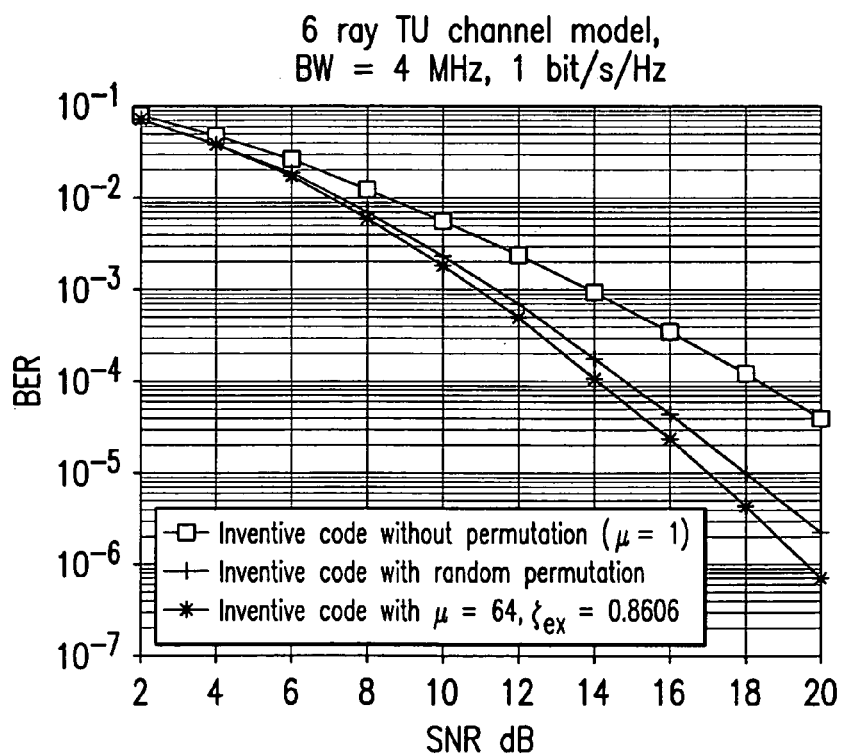

The code (74) was also implemented with the TU and HT channel models in accordance with two situations: a) BW=1 MHz, and b) BW=4 MHz. FIGS. 7A-7B provide the performance results of the code with different permutations for the TU channel model, from which it may be observed that in both cases, the code with random permutation has a significant improvement over the non-permuted code. Using the inventive permutation with a separation factor μ=64, there is an additional gain of 1.5 dB and 1 dB at a BER of $10^{-5}$ in case of BW=1 MHz and BW=4 MHz, respectively.

Figure 8A:
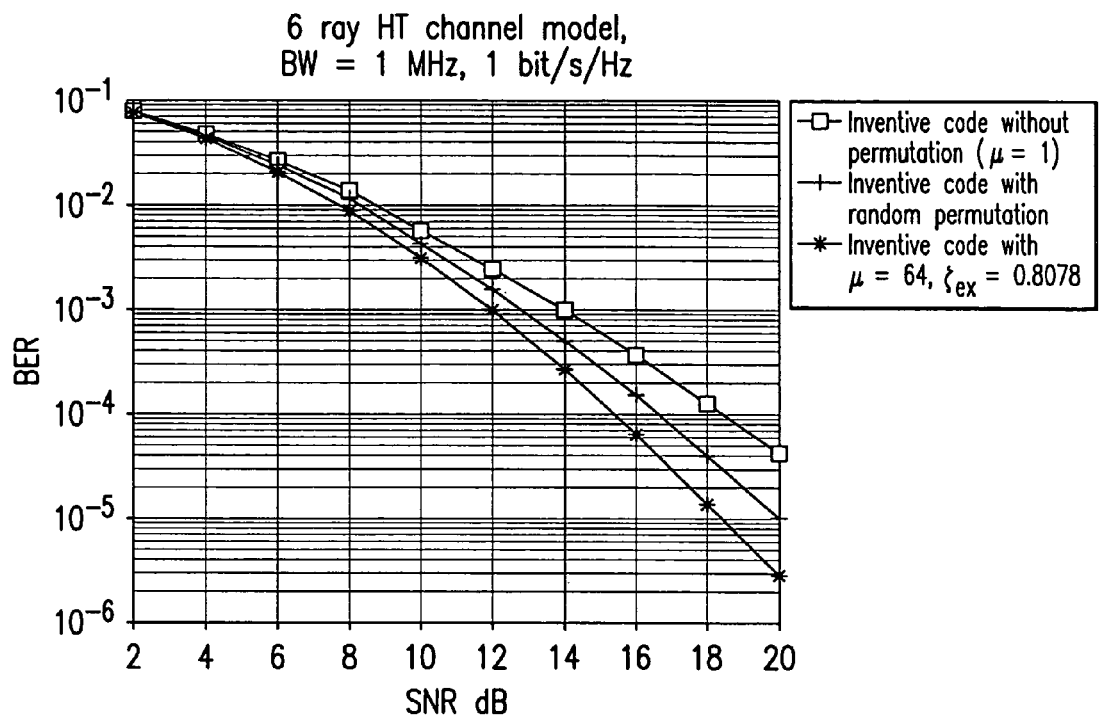
FIGS. 8A-8B are performance graphs of an exemplary space-frequency code of the present invention.
Figure 8B:
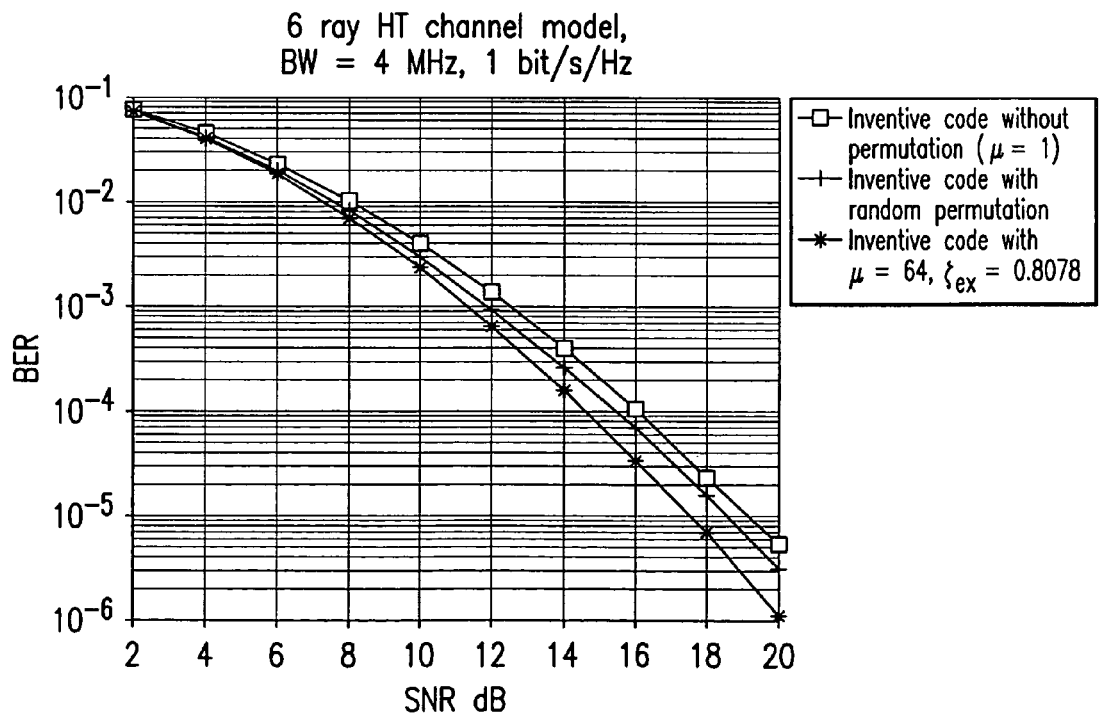

FIGS. 8A-8B depicts the illustrative results for the HT channel model. As is shown in the BW=1 MHz case, the performance gain of the permuted codes is larger than in the BW=4 MHz case. In both cases, the code with the permutation of the present invention (μ=64) outperforms the code with the random permutation. There is a 1.5 dB performance improvement at a BER of $10^{-5}$ in case of BW=1 MHz, and a 1 dB improvement in case of BW=4 MHz.

The SF code of the present invention is a clear improvement over systems of the prior art in that full-rate transmission may be achieved with full-diversity in the space-frequency domain. However, certain implementations will require a shift in operating principles of existing systems, which may not be desirable. New codes in compliance with the present invention would replace old codes of existing systems, which, in certain cases, may be cost prohibitive. To provide certain ones of the advantageous features of the present invention, while, at the same time, utilizing some existing infrastructure, SF codes may be mapped, in accordance with aspects of the present invention, from existing space-time (ST) codes.

5. Space-Frequency (SF) Codes from Space-Time (ST) Codes via Mapping

Among the beneficial features of the invention is a simple repetition mapping, from which full-diversity SF codes can be constructed from any ST (block or trellis) code designed for quasistatic flat Rayleigh fading channels.

Figure 2:
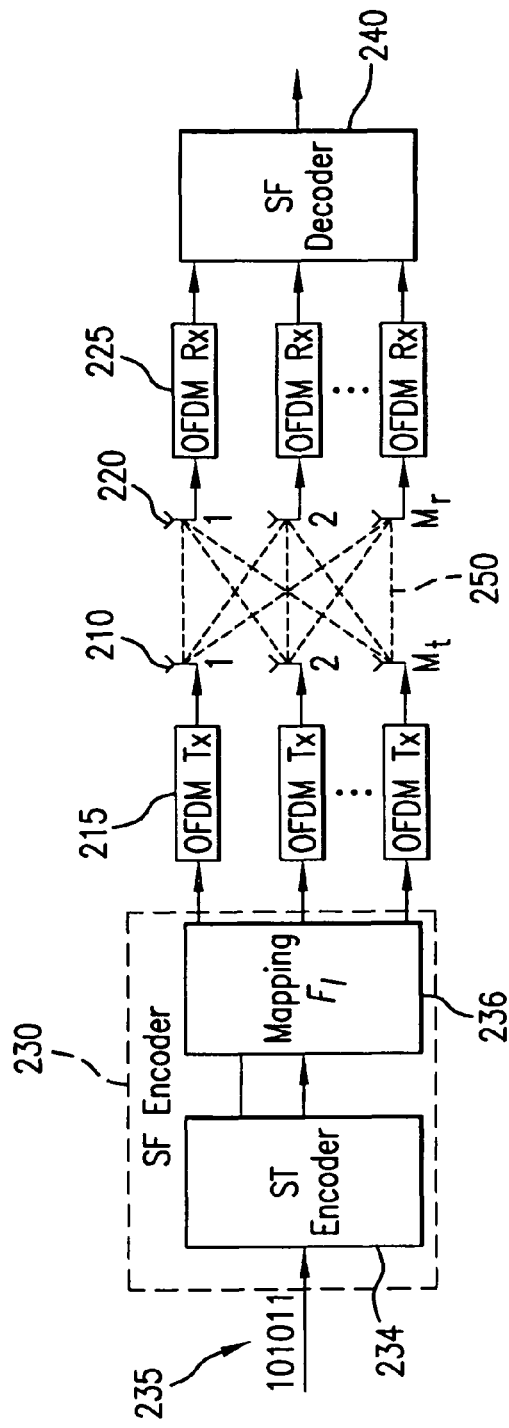
FIG. 2 is a schematic block diagram illustrating a further exemplary embodiment of an apparatus operable in accordance with the present invention.

As shown in FIG. 2, the SF encoder 230 consists of an ST encoder 234 and mapping unit 236 for performing a mapping $F_l$. For each $1 \times M_t$ output vector ($g_1\ g_2\ \ldots\ g_{m_t}$) from the ST encoder 230 and a fixed number l ($1 \leq l \leq L$), the mapping being defined as $$F_l: (g_1\ g_2\ \ldots\ g_{M_t}) \rightarrow 1_{l \times 1}(g_1\ g_2\ \ldots\ g_{M_t}), \quad (77)$$

where $1_{l \times 1}$ is an all one matrix of size l×1. The resulting $l \times M_t$ matrix is actually a representation of the vector ($g_1\ g_2\ \ldots\ g_{M_t}$) l times. Suppose that $lM_t$ is not greater than the number of OFDM subcarriers N, and k is the largest integer such that $klM_t \leq N$. Denote the output code matrix of the ST encoder by G. Note that for a space-time block encoder, G is a concatenation of some block codewords. For a space-time trellis encoder, G corresponds to the path of length $kM_t$ starting and ending at the zero state. Then, the SF code C of size $N \times M_t$ is constructed as $$C = \begin{bmatrix} F_l(G) \\ 0_{(N-klM_t) \times M_t} \end{bmatrix} \text{ where} \quad (78)$$

$$F_l(G) = [I_{M_t} \otimes 1_{l \times 1}]G \quad (79)$$

In fact, SF code C is obtained by repeating each row of G l times and adding some zeros. The zero padding used here ensures that the space-frequency code C has size $N \times M_t$. Typically, the size of the zero padding is small, and it can be used to drive the trellis encoder to the zero state. According to the present invention, if the employed ST code G has full diversity for quasistatic flat fading channels, the space-frequency code constructed by (78) will achieve a diversity of at least $lM_tM_r$.

As shown in FIG. 2, a MIMO-OFDM system is equipped with $M_t$ transmit antennas 210 and $M_r$ receive antennas 220, and has N subcarriers and that the frequency-selective channel 250 has L independent paths, in which the maximum path delay is less than one OFDM block period. If an ST (block or trellis) code designed for $M_t$ transmit antennas achieves full diversity for quasistatic flat fading channels, then the SF code (78) from the ST code in accordance with the mapping of the present invention, $F_l(1 \leq l \leq L)$ defined in (79) will achieve a diversity order of at least min $\{lM_tM_r, NM_r\}$.

To show this to be true, it is known that in typical MIMO-OFDM systems, the number of subcarriers N is greater than $LM_t$, and, thus, the proof for the $lM_t \leq N$ case may be shown for a given mapping $F_l$, $1 \leq l \leq L$. If $lM_t > N$, the proof follows similar lines, but will be omitted for brevity. Assume that k is the largest integer such that $klM_t \leq N$.

For two distinct codewords C and $\tilde{C}$ of size $N \times M_t$, there are two corresponding codewords G and $\tilde{G}$ of size $kM_t \times M_t$ such that $$C - \tilde{C} = \begin{bmatrix} F_l(G - \tilde{G}) \\ 0_{(N-klM_t) \times M_t} \end{bmatrix} \text{ in which} \quad (80)$$

$$F_l(G - \tilde{G}) = [I_{M_t} \otimes 1_{l \times 1}](G - \tilde{G}). \quad (81)$$

Since the ST code achieves full diversity for quasistatic flat fading channels, $(G - \tilde{G})$ is of full rank for two distinct G and $\tilde{G}$, i.e., the rank of $(G - \tilde{G})$ is $M_t$.

Using the performance criteria described above, the objective of the proof is to show that the matrix $\Delta \circ R$ has a rank of at least $lM_r$. From (25) and (80), it is observed $$\Delta = \begin{bmatrix} F_l(G-\tilde{G})[F_l(G-\tilde{G})]^{\Psi} & 0_{klM_t \times (N-klM_t)} \\ 0_{(N-klM_t) \times klM_t} & 0_{(N-klM_t) \times (N-klM_t)} \end{bmatrix}. \quad (82)$$

Thus, in $\Delta \circ R$, all entries are zero, except for a $klM_t \times klM_t$ submatrix, which will be denoted as $(\Delta \circ R)_{klM_t \times klM_t}$.

On the other hand, from (24), it can be verified that the entries of the correlation matrix $R = \{r_{i,j}\}_{1 \leq i,j \leq N}$ can be expressed as $$r_{i,j} = \sum_{s=0}^{L-1} \delta_s^2 w^{(i-j)\tau_s}, \ 1 \leq i, j \leq N. \quad$$

Therefore, from (80)-(82), it can be ascertained that $$(\Delta \cdot R)_{klM_t \times klM_t} = \{F_l(G-\tilde{G})[F_l(G-\tilde{G})]^{\Psi}\} \cdot P \quad (83)$$

$$= \{[I_{M_t} \otimes 1_{l \times 1}](G-\tilde{G})(G-\tilde{G})^{\Psi}[I_{M_t} \otimes 1_{l \times 1}]^{\Psi}\} \cdot P$$

$$= \{[(G-\tilde{G})(G-\tilde{G})^{\Psi}] \otimes 1_{l \times 1}\} \cdot P$$

where $P = \{p_{i,j}\}_{1 \leq i,j \leq klM_t}$ is a $klM_t \times klM_t$ matrix with entries $$p_{i,j} = \sum_{s=0}^{L-1} \delta_s^2 w^{(i-j)\tau_s}, \ 1 \leq i, j \leq klM_t. \quad (84)$$

The last equality in (83) follows from the identities $[I_{kM_t} \otimes 1_{l \times l}]^{\Psi}$ and $(A_1 \otimes B_1)(A_2 \otimes B_2)(A_3 \otimes B_3) = (A_1 A_2 A_3) \otimes (B_1 B_2 B_3)$.

The $klM_t \times klM_t$ matrix $P$ is further partitioned into $l \times l$ submatrices as follows:

$$P = \begin{bmatrix} P_{1,1} & P_{1,2} & \cdots & P_{1,kM_t} \\ P_{2,1} & P_{2,2} & \cdots & P_{2,kM_t} \\ \vdots & \vdots & \ddots & \vdots \\ P_{kM_t,1} & P_{kM_t,2} & \cdots & P_{kM_t,kM_t} \end{bmatrix} \quad (85)$$

where each submatrix $P_{m,n}$, $1 \leq m,n \leq kM_t$ is of size $l \times l$. Denoting the entries of $P_{m,n}$ as $p_{m,n}(i,j)$, $1 \leq i,j \leq l$, it is observed that $$p_{m,n}(i,j) = \sum_{s=0}^{L-1} \delta_s^2 w^{[(m-n)l+(i-j)]\tau_s}, \ 1 \leq i, j \leq l. \quad (86)$$

As a consequence, each submatrix $P_{m,n}$, $1 \leq m,n \leq kM_t$, can be expressed as $$P_{m,n} = W_m \text{diag}\{\delta_0^2, \delta_1^2, \ldots \delta_{L-1}^2\} W_n^{\Psi} \quad (87)$$

where $W_m$ is specified as $$W_m = \begin{bmatrix} w^{(m-1)l\tau_0} & w^{(m-1)l\tau_1} & \cdots & w^{(m-1)l\tau_{L-1}} \\ w^{[(m-1)l+1]\tau_0} & w^{[(m-1)l+1]\tau_1} & \cdots & w^{[(m-1)l+1]\tau_{L-1}} \\ \vdots & \vdots & \ddots & \vdots \\ w^{[(m-1)l+(l-1)]\tau_0} & w^{[(m-1)l+(l-1)]\tau_1} & \cdots & w^{[(m-1)l+(l-1)]\tau_{L-1}} \end{bmatrix} \quad (88)$$

for $m = 1, 2, \ldots, kM_t$. The matrix (88) can be further decomposed as $$W_m = W_1 \text{diag}\{w^{(m-1)\tau_0}, w^{(m-1)\tau_1}, \ldots, w^{(m-1)\tau_{L-1}}\} \quad (89)$$

for $1 \leq m \leq kM_t$, where $$W_1 = \begin{bmatrix} 1 & 1 & \cdots & 1 \\ w^{\tau_0} & w^{\tau_1} & \cdots & w^{\tau_{L-1}} \\ \vdots & \vdots & \ddots & \vdots \\ w^{(l-1)\tau_0} & w^{(l-1)\tau_1} & \cdots & w^{(l-1)\tau_{L-1}} \end{bmatrix}. \quad (90)$$

The matrix consisting of the first $l$ columns if $W_1$ may be denoted by $W_0$. In so doing, $W_0$ is an $l \times l$ Vandermonde matrix in $l$ variables $w^{\tau_0}, w^{\tau_1}, \ldots, w^{\tau_{l-1}}$. The determinant of $W_0$ can be calculated as follows:

$$\det(W_0) = \prod_{0 \leq i \leq j \leq l-1} (w^{\tau_j} - w^{\tau_i}) \quad (91)$$

$$= \prod_{0 \leq i \leq j \leq l-1} [e^{-j2\pi \Delta f (\tau_j - \tau_i)} - 1] e^{-j2\pi \Delta f \tau_i}.$$

Since $\Delta f$ is the inverse of the OFDM block period $T$ and the maximum path delay is less than $T$, $\Delta f (\tau_j - \tau_i) < 1$ for any $0 \leq i < j \leq l-1$. Thus, $W_0$ is of full rank, as is $W_1$. It follows that for any $m = 1, 2, \ldots, kM_t$, the rank of $W_m$ is $l$.

Returning to (83), the rank of $\Delta \circ R$ can be investigated. For convenience, the following notation is used:

$$(G - \tilde{G})(G - \tilde{G})^H \triangleq \begin{bmatrix} a_{1,1} & a_{1,2} & \cdots & a_{1,kM_t} \\ a_{2,1} & a_{2,2} & \cdots & a_{2,kM_t} \\ \vdots & \vdots & \ddots & \vdots \\ a_{kM_t,1} & a_{kM_t,2} & \cdots & a_{kM_t,kM_t} \end{bmatrix} \quad (92)$$

and $\Lambda = \text{diag}\{\delta_0^2, \delta_1^2, \delta_{L-1}^2,\}$. Then, substituting (85) and (87) into (83), it is observed that $$(\Delta \cdot R)_{kIM_t \times kIM_t} = \begin{bmatrix} a_{1,1}P_{1,1} & a_{1,2}P_{1,2} & \cdots & a_{1,kM_t}P_{1,kM_t} \\ a_{2,1}P_{2,1} & a_{2,2}P_{2,2} & \cdots & a_{2,kM_t}P_{2,kM_t} \\ \vdots & \vdots & \ddots & \vdots \\ a_{kM_t,1}P_{kM_t,1} & a_{kM_t,2}P_{kM_t,2} & \cdots & a_{kM_t,kM_t}P_{kM_t,kM_t} \end{bmatrix} \quad (93)$$

$$= \begin{bmatrix} W_1 a_{1,1} \Lambda W_1^\Psi & W_1 a_{1,1} \Lambda W_2^\Psi & \cdots & W_1 a_{1,kM_t} \Lambda W_{kM_t}^\Psi \\ W_2 a_{2,1} \Lambda W_1^\Psi & W_2 a_{2,2} \Lambda W_2^\Psi & \cdots & W_2 a_{2,kM_t} \Lambda W_{kM_t}^\Psi \\ \vdots & \vdots & \ddots & \vdots \\ W_{kM_t} a_{kM_t,1} \Lambda W_1^\Psi & W_{kM_t} a_{kM_t,2} \Lambda W_2^\Psi & \cdots & W_{kM_t} a_{kM_t,kM_t} \Lambda W_{kM_t}^\Psi \end{bmatrix}$$

$$= Q\{[(G-\tilde{G})(G-\tilde{G})^\Psi] \otimes \Lambda\}Q^\Psi$$

where $$Q = diag\{W_1, W_2, \cdots, W_{kM_t}\}.$$

Since the rank of $(G-\tilde{G})$ is $M_t$, there are $M_t$ linearly independent rows in $(G-\tilde{G})$. Suppose that the $f_i$-th, $1 \leq f_1 < f_2 < \ldots < f_M \leq kM_t$, rows of $(G-\tilde{G})$ are linearly independent of each other. Then, the matrix $$A \triangleq \begin{bmatrix} a_{f_1,f_1} & a_{f_1,f_2} & \cdots & a_{f_1,f_{M_t}} \\ a_{f_2,f_1} & a_{f_2,f_2} & \cdots & a_{f_2,f_{M_t}} \\ \vdots & \vdots & \ddots & \vdots \\ a_{f_{M_t},f_1} & a_{f_{M_t},f_2} & \cdots & a_{f_{M_t},f_{M_t}} \end{bmatrix} \quad (94)$$

is a submatrix of $(G-\tilde{G})(G-\tilde{G})$, and the rank of A is $M_t$. Using the notation $$Q_0 = diag\{W_{f_1}, W_{f_2}, \cdots, W_{f_{M_t}}\} \quad (95)$$

from (93), it is clear that $Q_0\{A \otimes \Lambda\} Q_0^\Psi$ is a $lM_t \times lM_t$ submatrix of $(\Delta \circ R)_{kIM_t \times kIM_t}$. Therefore, to show that the rank of $\Delta \circ R$ is at least $lM_t$, it is sufficient to show that the submatrix $Q_0\{A \otimes \Lambda\}Q_0^H$ is of rank $lM_t$.

Since the rank of A is $M_t$ and the rank of $\Lambda$ is L, according to a rank equality on tensor products $$\text{rank}(A \otimes \Lambda) = \text{rank}(A)\text{rank}(\Lambda) = M_t L \quad (96)$$

so the matrix $A \otimes \Lambda$ is of full rank. It is known that for any $m=1, 2, \ldots, kM_t$, the rank of $W_m$ is l, so the rank of $Q_0$ is $lM_t$. Therefore, the rank of $Q_0\{A \otimes \Lambda\} Q_0^\Psi$ is $lM_t$, which is what was intended to be shown.

The SF code obtained from a space-time block of square size via the mapping $F_l$ ($1 \leq l \leq L$) will achieve a diversity of $lM_tM_r$ exactly, which follows from the discussion above. Since the maximum achievable diversity is upper bounded by min $\{LM_tM_r, NM_r\}$, the following fundamental aspect of the invention is revealed: The SF code obtained from a full diversity ST code via the mapping $F_l$ defined in (79) achieves the maximum achievable diversity min $\{LM_tM_r, NM_r\}$.

The symbol rate of the resulting SF codes via the mapping $F_l$ is 1/l times that of the corresponding ST codes. However, the SF codes of the present invention achieve full space-frequency diversity. For example, for a system with two transmit antennas, eight subcarriers, and a two-ray delay profile, the symbol rate of the full-diversity SF codes introduced above is ½, whereas the symbol rate in prior art systems is only ¼. In certain practical applications, this effect can be compensated for by expanding the constellation size, maintaining the same spectral efficiency. Furthermore, from a system performance point of view, there is a tradeoff between the diversity order and the coding rate. The present invention offers a flexible choice in the diversity order.

The coding advantage of the resulting SF codes will now be characterized in terms of the coding advantage of the underlying ST codes by defining and evaluating the diversity product for SF codes. The effect of the delay distribution and the power distribution on the performance of the inventive SF codes will also be analyzed.

The diversity product, which is the normalized coding advantage of a full diversity ST code, has been defined for quasistatic flat-fading channels $$\zeta_{ST} = \frac{1}{2\sqrt{M_t}} \min_{G \neq \tilde{G}} \left| \prod_{i=1}^{M_t} \beta_i \right|^{\frac{1}{2M_t}} \quad (97)$$

where $\beta_1, \beta_2, \ldots, \beta_M$ are the nonzero eigenvalues of $(G-\tilde{G})(G-\tilde{G})^H$ for any pair of distinct ST codewords G and $\tilde{G}$.

Based on the upper bound on the pair-wise error probability, the diversity product of a full-diversity SF code can be defined as $$\zeta_{SF,R} = \frac{1}{2\sqrt{M_t}} \min_{C \neq \tilde{C}} \left| \prod_{i=1}^{LM_t} \lambda_i \right|^{\frac{1}{2LM_t}} \quad (98)$$

where $\lambda_1, \lambda_2, \lambda_{LM_t}$ are the nonzero eigenvalues of $\Delta \circ R$ for any pair of distinct space-frequency codewords C and $\tilde{C}$. In the following discussion, it is assumed, without loss of generality, that the number of subcarriers N is not less than $LM_t$, i.e., $LM_t \leq N$.

The diversity product of the full-diversity SF code described above is bounded by that of the corresponding ST codes as follows:

$$\sqrt{\eta_L}\Phi\zeta_{ST} \leq \zeta_{SF,R} \leq \sqrt{\eta_l}\Phi\zeta_{ST} \quad (99)$$

where $\Phi=(\Pi_{l=0}^{L-1}\delta_l)^{1/L}$, and $\eta_l$ and $\eta_L$ are the largest and smallest eigenvalues, respectively, of the matrix H, which is defined as $$H = \begin{bmatrix} H(0) & H(1)^* & \ldots & H(L-1)^* \\ H(1) & H(0) & \ldots & H(L-2)^* \\ \vdots & \vdots & \ddots & \vdots \\ H(L-1) & H(L-2) & \ldots & H(0) \end{bmatrix}_{L \times L} \quad (100)$$

and the entries of H are given by $$H(n) = \sum_{l=0}^{L-1} e^{-j2\pi n \Delta f \tau_l}, n = 0, 1, \ldots, L-1. \quad (101)$$

To show that this is so, we use the notation developed above by replacing the repetition factor l as L, since the full diversity is achieved by using the mapping $F_l$. For any n×n non-negative definite matrix A, we denote its eigenvalues as $eig_1(A) \geq eig_2(A) \geq \ldots \geq eig_n(A)$.

For two distinct codewords C and $\tilde{C}$, there are two corresponding ST codewords G and $\tilde{G}$, such that the relationship of C–$\tilde{C}$ and G–$\tilde{G}$ in (80) and (81) holds. The rank of $\Delta \circ R$ is exactly $LM_t$, which means that $\Delta \circ R$ has totally $LM_t$ eigenvalues, which are the same as the nonzero eigenvalues of $(\Delta \circ R)klM_t \times klM_t$. Thus, $$\zeta_{SF,R} = \frac{1}{2\sqrt{M_t}} \min_{C \neq \tilde{C}} \left| \prod_{i=1}^{LM_t} eig_i((\Delta \circ R)_{kLM_t \times kLM_t}) \right|^{\frac{1}{2LM_t}} \quad (102)$$

$$= \frac{1}{2\sqrt{M_t}} \min_{G \neq \tilde{G}} \left| \prod_{i=1}^{LM_t} eig_i(Q\{[(G-\tilde{G})(G-\tilde{G})^\Psi] \otimes \Lambda\}Q^\Psi) \right|^{\frac{1}{2LM_t}}$$

$$= \frac{1}{2\sqrt{M_t}} \min_{G \neq \tilde{G}} \left| \prod_{i=1}^{LM_t} \theta_i eig_i([(G-\tilde{G})(G-\tilde{G})^\Psi] \otimes \Lambda) \right|^{\frac{1}{2LM_t}}$$

where $eig_{kLM_t}(QQ^\Psi) \leq \theta_i \leq eig_1(QQ^\Psi)$ for $i=1, 2, \ldots LM_t$. In (102), the second equality follows from (93), and the last equality follows by Ostrowski's theorem. Since, Q=diag$\{W_1, W_2, \ldots, W_{kM_t}\}$, then $$QQ^\Psi = \text{diag}\{W_1 W_1^\Psi, W_2 W_2^\Psi, W_{km_t} W_{kM_t}^\Psi\}.$$

As a requirement of Ostrowski's theorem, the matrix Q should be nonsingular, which is guaranteed by the fact that each matrix $W_m$ is of full rank for any m=1, 2, . . . , $kM_t$. Furthermore, from (89), it is observed that for any $1 \leq m \leq kM_t$ $$W_m W_m^\Psi = W_1 DD^\Psi W_1^\Psi = W_1 W_1^\Psi$$

where D=diag $\{W^{(m-1)L\tau_0}, W^{(m-1)L\tau_1}, \ldots, W^{(m-1)L\tau_{L-1}}\}$. From (90), it is easy to verify that $W_1 W_1^\Psi$ is the matrix H defined in (100). Thus, $QQ^\Psi = I_{kM_t} \otimes H$. Therefore, it can be concluded that $eig_L(H) \leq \theta_i \leq eig_1(H)$, for any i=1, 2, . . . , $LM_t$.

Since the set of $LM_t$ nonzero eigenvalues of $[(G-\tilde{G})(G-\tilde{G})^\Psi] \otimes \Lambda$ can be expressed as $$\{eig_i((G-\tilde{G})(G-\tilde{G})) \cdot eig_j(\Lambda) : 1 \leq i \leq M_t, 1 \leq j \leq L\} \quad (103)$$

substituting (103) into (102), we arrive at $$\zeta_{SF,R} = \frac{1}{2\sqrt{M_t}} \min_{G \neq \tilde{G}} \left( \prod_{i=1}^{LM_t} \theta_i \right)^{\frac{1}{2LM_t}} \times \quad (104)$$

$$\left| \prod_{i=1}^{M_t} eig_i((G-\tilde{G})(G-\tilde{G})^\Psi) \right|^{\frac{1}{2M_t}}$$

$$\left( \prod_{j=1}^{L} eig_j(\Lambda) \right)^{\frac{1}{2L}}$$

$$= \left( \prod_{i=1}^{LM_t} \theta_i \right)^{\frac{1}{2LM_t}} \left( \prod_{j=1}^{L} \delta_j^2 \right)^{\frac{1}{2L}} \zeta_{ST}$$

Since $\eta_L \leq \theta_i \leq \eta_l$ for any i=1, 2, . . . ,$LM_t$, the results shown in (99) are proven.

From the above, it is apparent that the larger the coding advantage of the ST code, the larger the coding advantage of the resulting SF code, suggesting that to maximize the performance of the SF codes, the best known ST codes existing in the art should be utilized. Moreover, the coding advantage of the resulting SF code depends on the power delay profile. First, it depends on the power distribution through the square root of the geometric average of the path powers, i.e., $\Phi=(\Pi_{l=0}^{L-1}\delta_l^2)^{1/L}$. Since the sum of the powers of the paths is unity, it is apparent that the best performance is expected from the uniform power distribution case, i.e. $\delta_l^2 = 1/L$. Secondly, the entries of the matrix H defined in (100) are functions of path delays, and therefore the coding advantage also depends on the delay distribution of the paths. For example, in case of a two-ray delay profile, (i.e., L=2), the matrix H has two eigenvalues:

$$\eta_1 = 2 + 2 \left| \cos \frac{\pi(\tau_1 - \tau_0)}{T} \right|$$

$$\eta_2 = 2 - 2 \left| \cos \frac{\pi(\tau_1 - \tau_0)}{T} \right|.$$

Typically, the ration of $(\tau_1-\tau_0)/T$ is less than ½ and therefore $\cos \pi(\tau_1-\tau_0)/T$ is non-negative. Thus, the smaller the separation of the two rays, the smaller the eigenvalues $\eta_2$. If the two rays are very close compared with the duration T of one OFDM symbol, the lower bound in (99) approaches zero.

In an illustrative example, the signal coding through mapping of the present was implemented via SF codes from ST block code and ST trellis codes. The SF block codes were obtained form orthogonal ST block codes for two and four transmit antennas. For the case of two transmit antennas, 2×2 orthogonal ST block codes according to the known Alamouti's structure was used, which is given by $$G_2 = \begin{bmatrix} x_1 & x_2 \\ -x_2^* & x_1^* \end{bmatrix}. \quad (105)$$

The SF block code for four transmit antennas was obtained from the 4×4 orthogonal design $$G_4 = \begin{bmatrix} x_1 & x_2 & x_3 & 0 \\ -x_2^* & x_1^* & 0 & x_3 \\ -x_3^* & 0 & x_1^* & -x_2 \\ 0 & -x_3^* & x_2^* & x_1 \end{bmatrix}. \qquad (106)$$

In both cases, the entries $x_i$ were taken from BPSK or QPSK constellations. Note that the 2×2 orthogonal design could carry one channel symbol per subcarrier, while the 4×4 block code had a symbol rate of only ¾. For SF trellis codes, the two-antenna, four-state, QPSK space-time code, and the three-antenna, 16-state, QPSK space-time code were utilized.

The SF block codes and trellis were implemented with different power delay profiles: a two-ray equal power delay profile and COST207 typical urban (TU) six-ray power delay profile. The subcarrier path gains were generated according to the system model characterized by (12), independently for different transmit and receive antennas. The Figures illustrate the results in the form of bit-error rate (BER) curves as a function of the average SNR per bit, where the inventive full-diversity SF block codes are compared with the SF codes using ST codes directly at the same spectral density.

In a first example of the present invention, a simple two-ray, equal power delay profile of τμs between the two rays is assumed. Two cases were implemented: i) τ=5 μs and ii) τ=20 μs. In the illustrative example, the communication system had N=128 subcarriers, and the total bandwidth was BW=1 MHz. Thus, the OFDM block duration was T=128 μs without the cyclic prefix. The length of the cyclic prefix was set to 20 Us in all cases. The MIMO-OFDM systems had one receive antenna. In all of the illustrative curves, the dashed lines correspond to the τ=5 μS case and the solid lines correspond to the 20 μs case. The curves with squares show the performance of the full-diversity SF codes obtained by repeating each row of the ST codes two times. The curves with the circles show the results for the case of using ST codes directly as SF codes (i.e., no repetition).

Figure 9A:
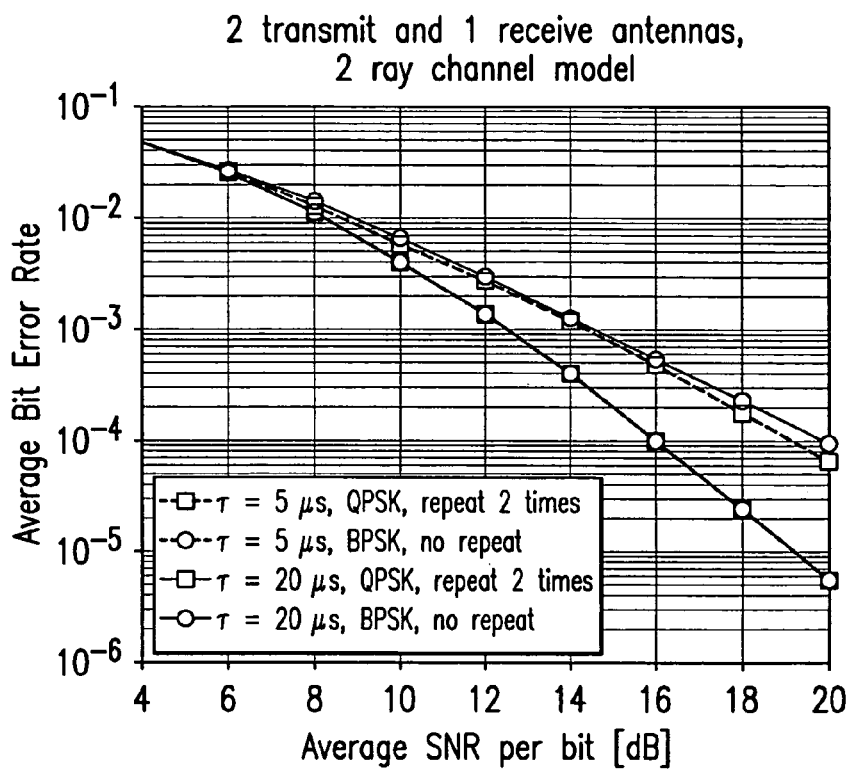
FIGS. 9A-9B are performance graphs of an exemplary space-frequency code as mapped from a space-time code in accordance with the present invention.

FIG. 9A depicts the performance of the SF block codes obtained from the two-antenna orthogonal design. BPSK modulation was used for the non-repeated case and QPSK for the repeated case. Therefore, both systems had a spectral efficiency of ((128×1b)/((128 μs+20 μs)×1 MHz))=0.86 b/s/Hz. The Figure shows that in the case of τ=20 μs, the performance curve of the mapped full-diversity SF code has a steeper slope than that of the unmapped code. A performance improvement of approximately 4 dB at a BER of $10^{-4}$ can be observed in the Figure. The performance of the full-diversity SF code degraded significantly from the τ=20 μs to the τ=5 μs case, whereas the performance of the SF code implemented as an unmapped ST code was almost the same for both delay profiles. This observation is consistent with the previous discussion regarding the coding advantage being dependent on the delay distribution of the multiple paths. It is also in agreement with results described in the literature that using ST codes directly as SF codes can exploit only the spatial diversity.

Figure 9B:
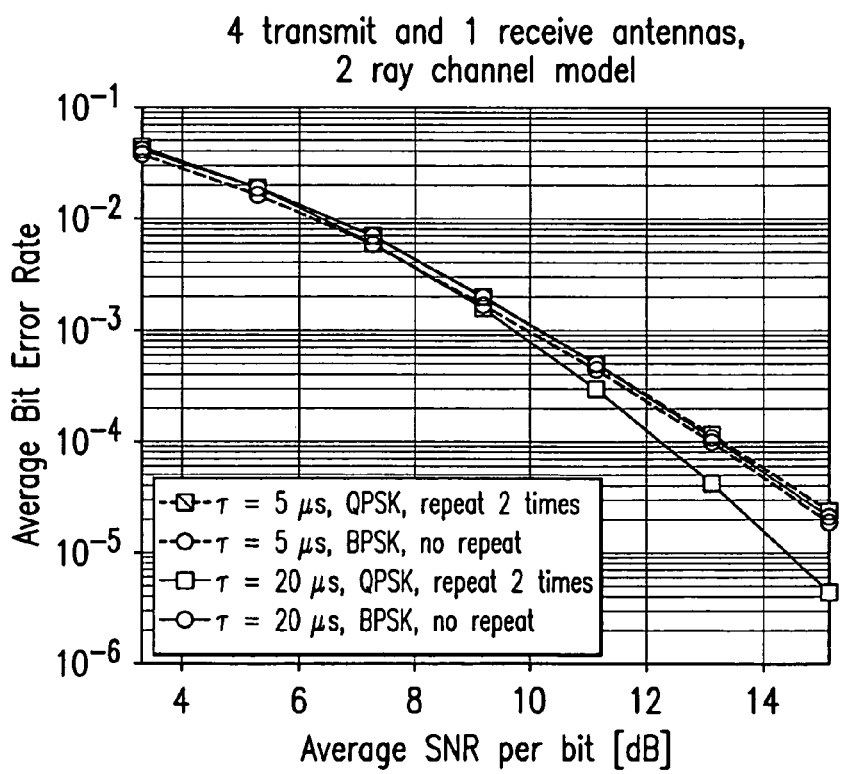

FIG. 9B shows the performance of the SF block codes obtained from the orthogonal ST code for four transmit antennas. The mapped full-diversity SF code used QPSK modulation, and the non-repeated code used BPSK modulation. Thus, the spectral efficiency of both codes was ((128×3/4b)/((128 μs+20 μs)×1 MHz))=0.65 b/s/Hz. The tendencies observed in FIG. 9B are similar to those observed in FIG. 9A. In the case of τ=5 μs, the performance of the inventive mapped SF code is slightly less than that of the SF code using ST code without repetition. The diminished performance is due to the smaller coding advantage of the proposed SF code since, in order to keep the same spectral efficiency for the two schemes for purposes of comparison, QPSK modulation was used for the inventive SF code and BPSK modulation was used for the non-repeated code.

Figure 10A:
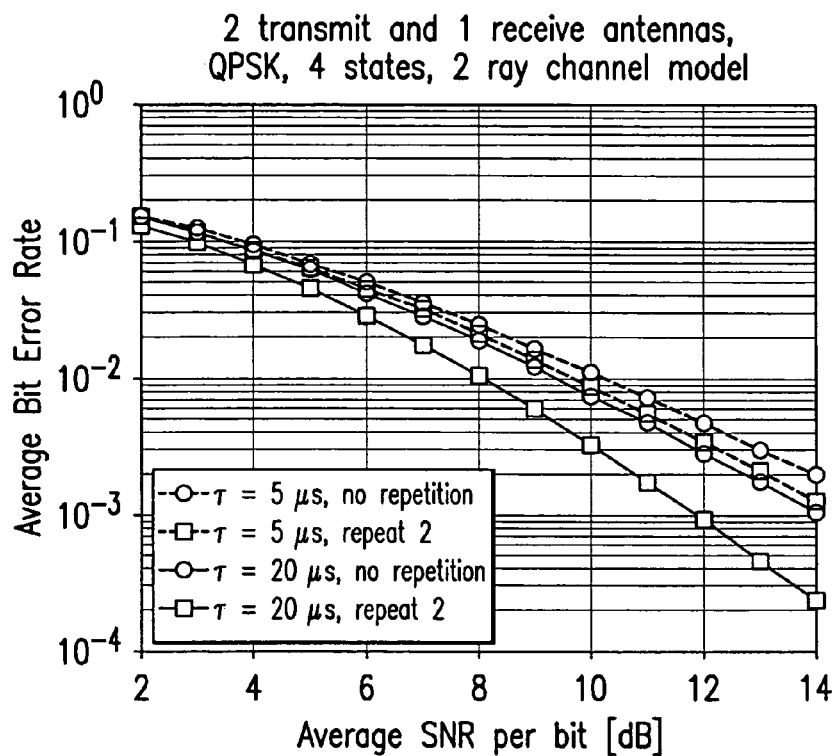
FIGS. 10A-10B are performance graphs of an exemplary space-frequency code as mapped from a space-time code in accordance with the present invention.
Figure 10B:
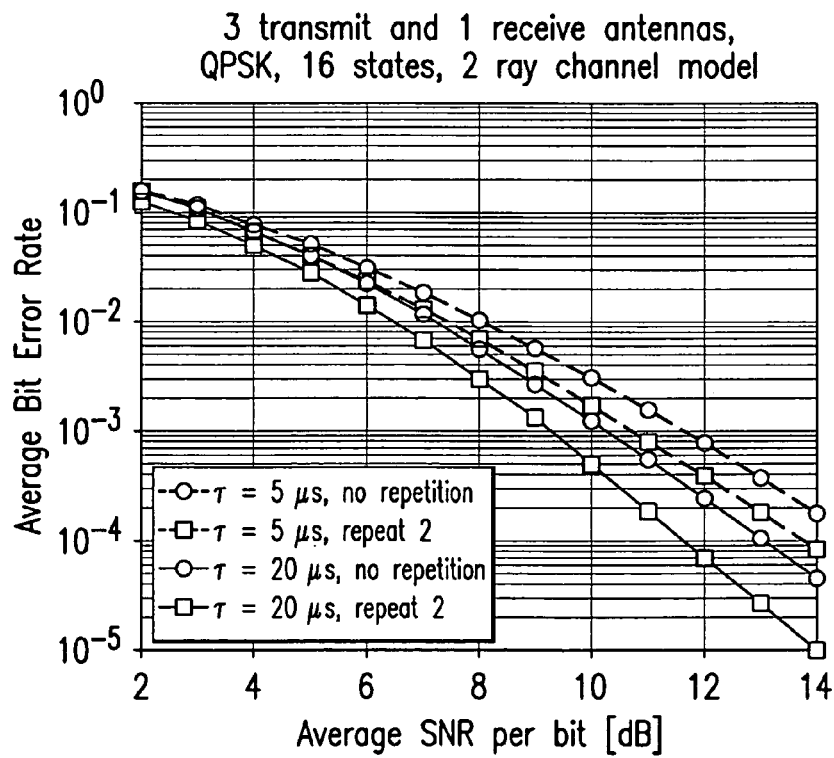

The performance of the SF trellis codes for two and three transmit antennas are depicted in FIG. 10A and FIG. 10B, respectively. It can be observed that the full-diversity SF trellis codes of the present invention have better diversity order than the non-repeated codes for the case of the longer delay profile (i.e., τ=20 μs). At a BER of $10^{-3}$, there is an improvement of about 2 dB for the two-antenna case and an improvement of about 1 dB for the three-antenna case. The modulation scheme was QPSK for all trellis codes; therefore, the non-repeated codes achieved a spectral efficiency of 1.73 b/s/Hz, whereas the repeated codes had a spectral efficiency of 0.86 b/s/Hz. Note that FIGS. 10A and 10B demonstrate that the proposed SF code construction method can be used to produce a set of codes that have different rates and error correction capabilities, offering different tradeoffs between code rate and diversity order.

Certain observations can be made from the illustrative examples. It is apparent that by repeating each row of the space-time code matrix, codes may be constructed whose error performance curve is steeper than that of the codes without repetition, i.e., the obtained codes have higher diversity order. However, the actual performance of the code depends heavily on the underlying channel model. In all cases, both the absolute performance and the performance improvement obtained by repetition are considerably better in case of the longer delay profile (i.e., τ=20 μs), and the performance of the obtained full-diversity SF codes degrade significantly in case of the delay profile with τ=5 μs. These phenomena can be explained as follows.

The delay distribution of the channel has a significant effect on the SF code performance. If the delays of the paths are large with respect to one OFDM block period, there will be fast variations in the spectrum of the channel impulse response; therefore, the probability of simultaneous deep fades in adjacent sub-channels will be smaller. This observation is in accordance with previous discussions, it should be expected that better BER performance occurs when transmitting data over channels with larger path delays. On the other hand, if the two delay paths are very close, the channel may cause performance degradation.

Figure 11A:
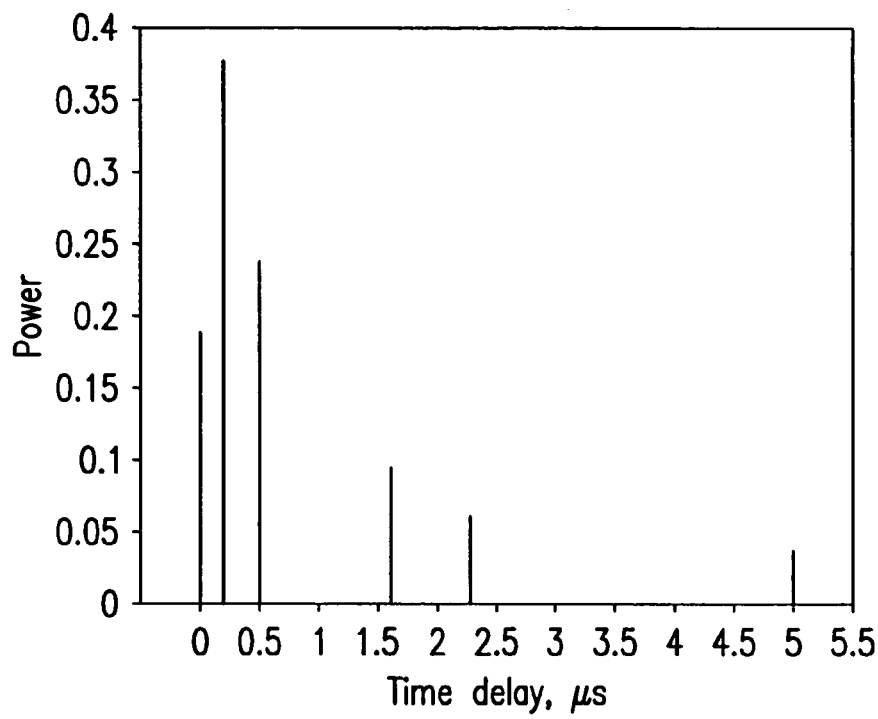
FIG. 11A is a graph depicting a power delay profile used to illustrate the performance of embodiments of the present invention.

A second implementation was performed using a more realistic channel model. The SF codes simulated in the previous subsection were tested over the COST207 Typical Urban (TU) six-ray channel model. The power delay profile of the channel is shown in FIG. 11A. A MIMO-OFDM system was implemented having N=128 subcarriers with two different bandwidths: i) BW=1 MHz (denoted by dashed lines), and ii) BW=4 MHz (denoted by solid lines). The cyclic prefix was set at 20 μs for both cases. In all of the simulations, the curves with squares show the performance of the SF codes obtained by repeating each row of the corresponding space-time codes two times, and the curves with circles show the results for the case of using ST codes as SF codes (without repetition).

Figure 11B:
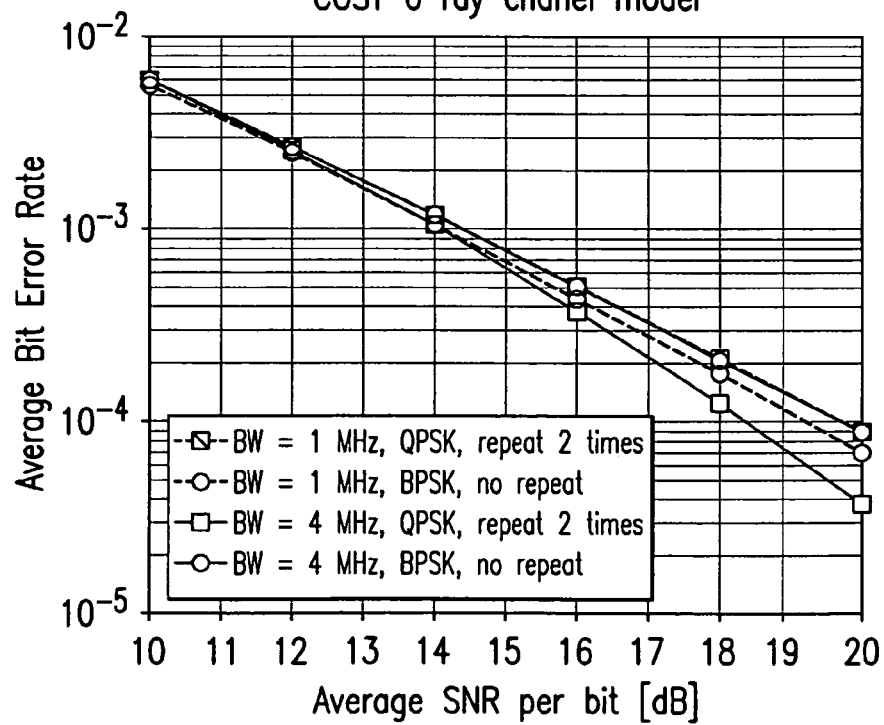
FIG. 11B is a performance graph of an exemplary space-frequency code as mapped from a space-time code in accordance with the present invention.

The performance of the SF block codes from the 2×2 orthogonal design with and without repetition are shown in FIG. 11B for two transmit and one receive antennas. The repeated code (using QPSK modulation) and the non-repeated code (using BPSK modulation) had the same spectral efficiency of 0.86 b/s/Hz for the 1-MHz system and 0.22 b/s/Hz for the 4-MHz system, respectively. It can be observed from the figure that in the case of BW=4 MHz, the code with repetition has a steeper performance curve than the code without repetition. There is a performance improvement of about 2 dB at a BER of $10^{-4}$. In case of BW=1 MHz, the maximum delay of the TU profile (5.0 μs) is "short" compared to the "long" duration of the OFDM block (128 μs), which means that there is little frequency diversity available in the fading channel. From the Figure, it is apparent that the performance of the repeated code is worse than the non-repeated code, due to the smaller coding advantage, which is a result of the larger constellation size.

The performance of the inventive full-rate full-diversity SF codes was also compared with that of full-diversity SF codes, such as the mapped SF codes described herein. The full-rate code (74) was implemented with symbols $s_1$, $s_2$, $s_3$, $s_4$ chosen from a QPSK constellation. The symbol rate of the code is 1, and the spectral efficiency is 2 bits/s/Hz, ignoring the cyclic prefix. The full-diversity SF code for comparison is a repetition of the Alamouti scheme two times as follows:

$$G = \begin{bmatrix} x_1 & x_2 \\ x_1 & x_2 \\ -x_2^* & x_1^* \\ -x_2^* & x_1^* \end{bmatrix}, \quad (107)$$

where the channel symbols $x_1$ and $x_2$ were chosen from 16-QAM in order to maintain the same spectral efficiency. In FIGS. 14A-16B, the curves with diamonds and circles show the performance of the SF code from orthogonal design (107) without permutation and with the random permutation (76), respectively.

Figure 14A:
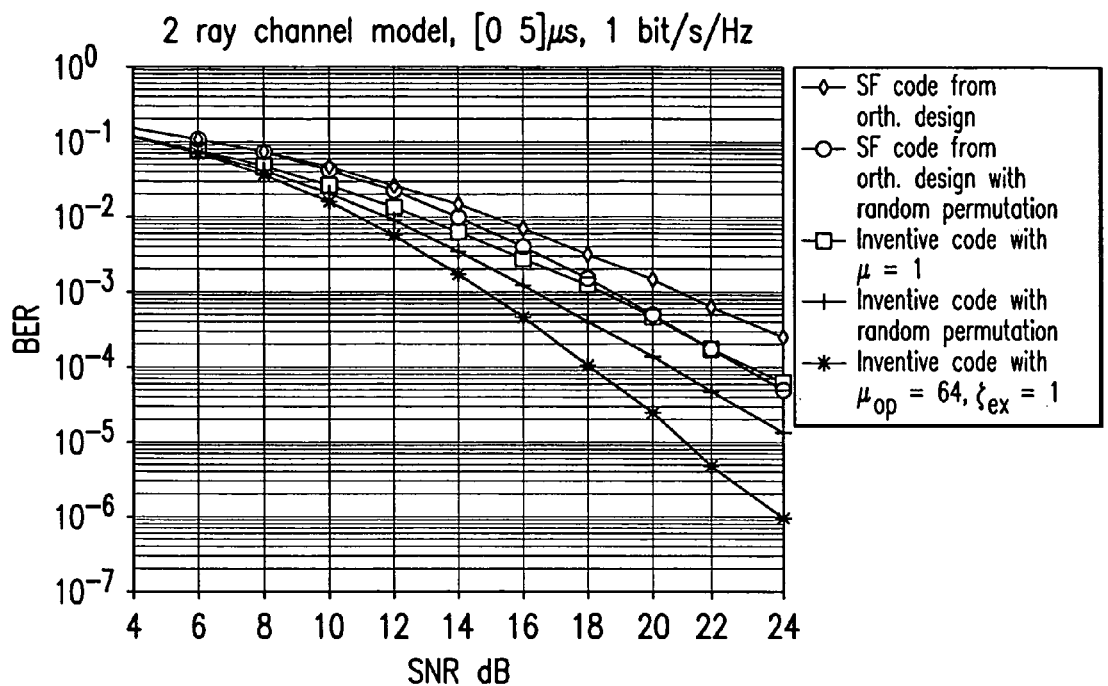
FIGS. 14A-14B are performance graphs comparing alternative constructions of space-frequency codes of the present invention.
Figure 14B:
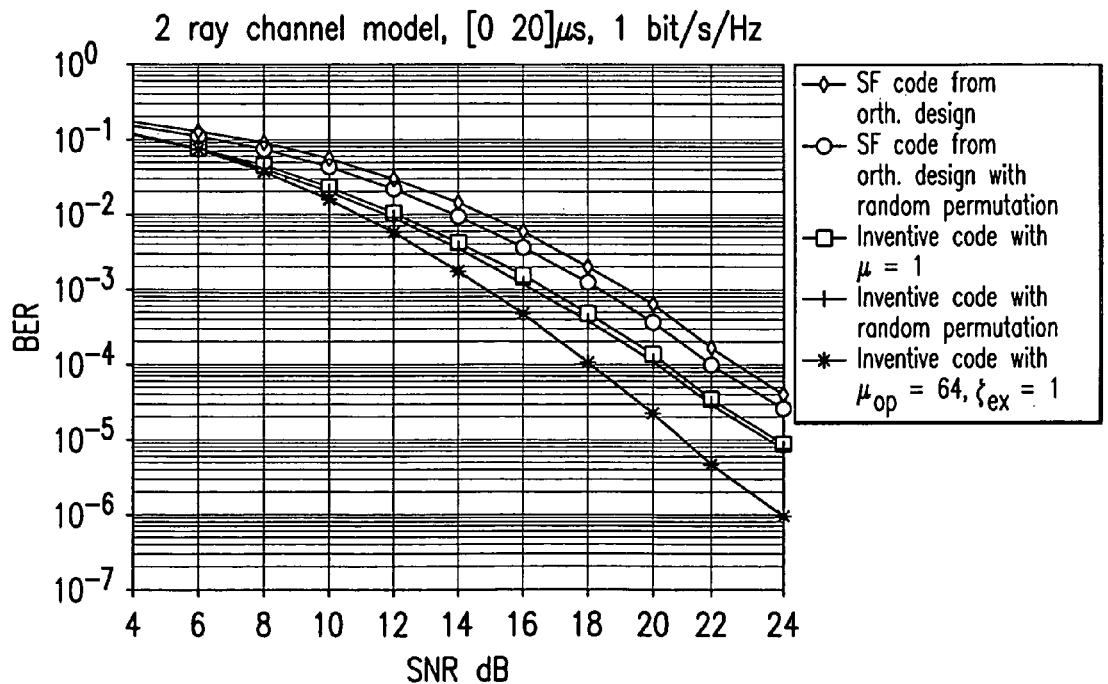

First, a 2-ray, equal-power profile, with a) τ=5 μs, and b) τ=20 μs was implemented. The total bandwidth was BW=1 MHz. From the BER curve of the τ=5 μs case, depicted in FIG. 14A, it can be observed that without permutation, the inventive full-rate SF code outperforms the SF code from orthogonal design by about 3 dB at a BER of $10^{-4}$. With the random permutation (76), the inventive full-rate code outperforms the code from orthogonal design by about 2 dB at a BER of $10^{-4}$. With the optimum permutation ($\mu_{op}$=64), the inventive code has an additional gain of 3 dB at a BER of $10^{-4}$. Compared to the code from orthogonal design with the random permutation, the inventive full-rate code with the optimum permutation has a total gain of 5 dB at a BER of $10^{-4}$. FIG. 14B shows the performance of the SF codes in the τ=20 μs. It can be seen that without permutation, the inventive full-rate code outperforms the code (107) by about 2 dB at a BER of $10^{-4}$. With the random permutation (76), the performance of the inventive code is better than that of the code (107) by about 2 dB at a BER of $10^{-4}$. With the optimum permutation ($\mu_{op}$=161 an additional improvement of 2 dB at a BER of $10^{-4}$ is achieved by the inventive full-rate-full-diversity code.

Figure 15A:
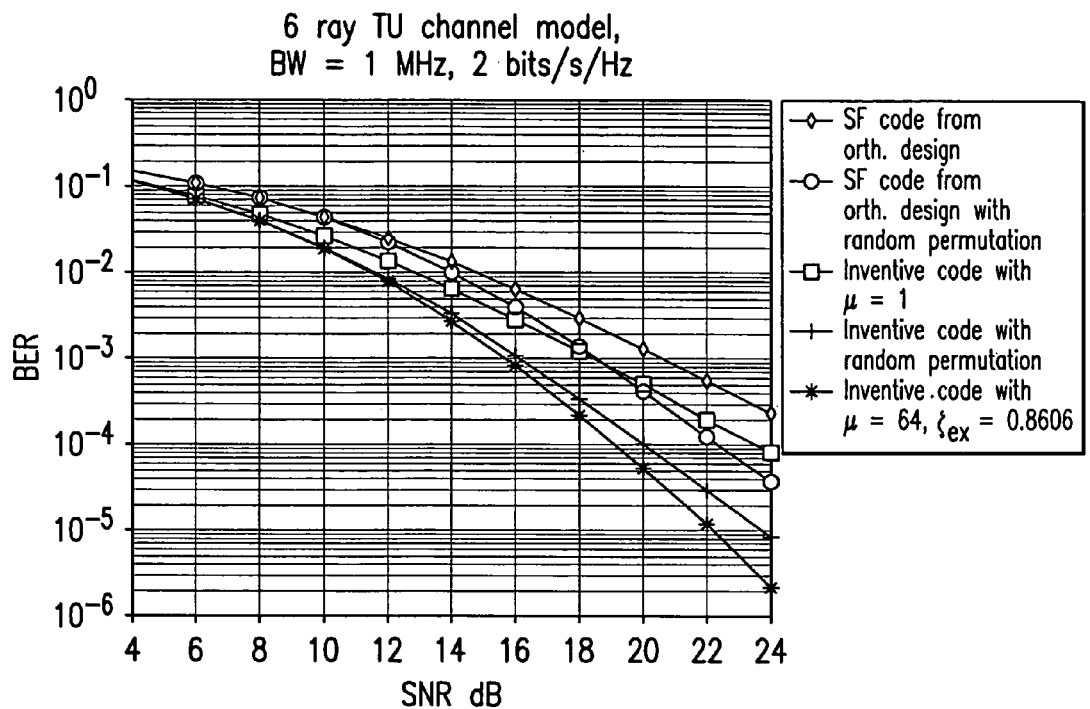
FIGS. 15A-15B are performance graphs comparing alternative constructions of space-frequency codes of the present invention.
Figure 15B:
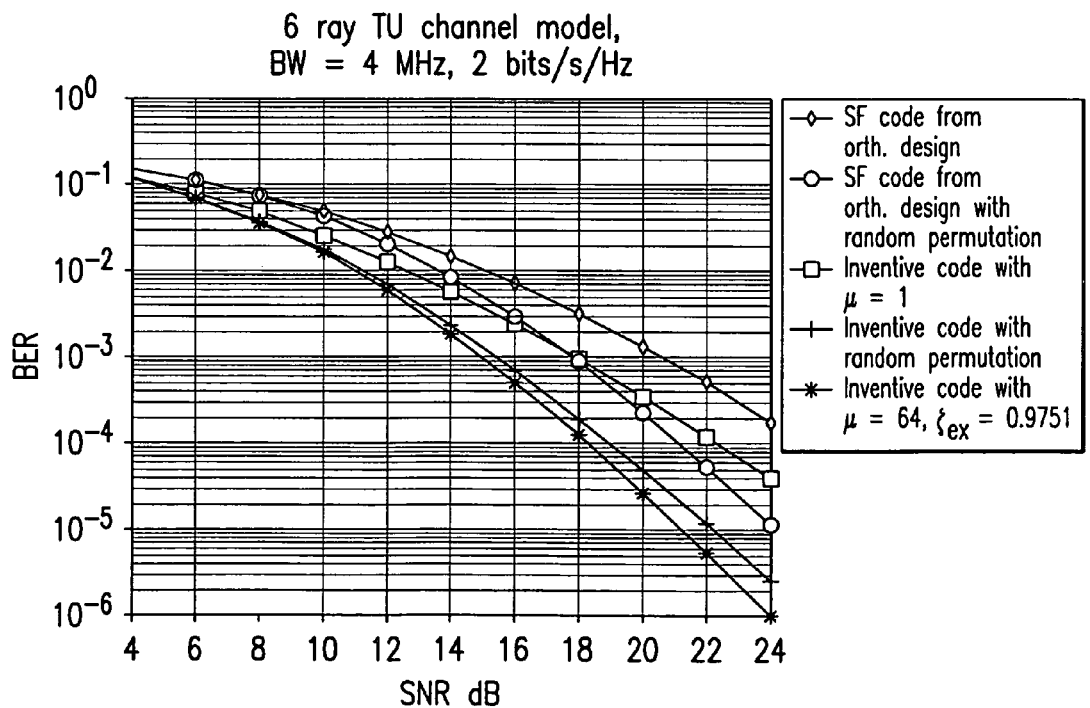

The two SF codes were also implemented using the TU and HT channel models. Two situation were considered: a) BW=1 MHz, and b) BW=4 MHz. FIG. 15A-15B depicts the performance curves for the TU channel model. In the of BW=1 MHz case, from FIG. 15A, it can be observed that without permutation, the full-rate SF code outperforms the SF code (107) by about 2 dB at a BER of $10^{-4}$. With the random permutation (76), the performance of the inventive full-rate code is better than that of the code from orthogonal design by about 2.5 dB at a BER of $10^{-4}$. With the inventive permutation ($\mu_{op}$=64), an additional improvement of 1 dB at a BER of $10^{-4}$ is achieved by the inventive full-rate full-diversity SF code. In the BW=4 MHz case, from FIG. 15B, it is observed that without permutation, the performance of the inventive code is better than that of the code from orthogonal design by about 3 dB at a BER of $10^{-4}$. With the random permutation, the inventive SF code outperforms the SF code (107) by about 2 dB at a BER of $10^{-4}$. With the inventive permutation ($\mu_{op}$=64), there is an additional gain of about 1 dB at a BER of $10^{-4}$. Compared to the SF code from orthogonal design with the random permutation, the proposed SF code with the permutation of the present invention has a total gain of 3 dB at a BER of $10^{-4}$.

Figure 16A:
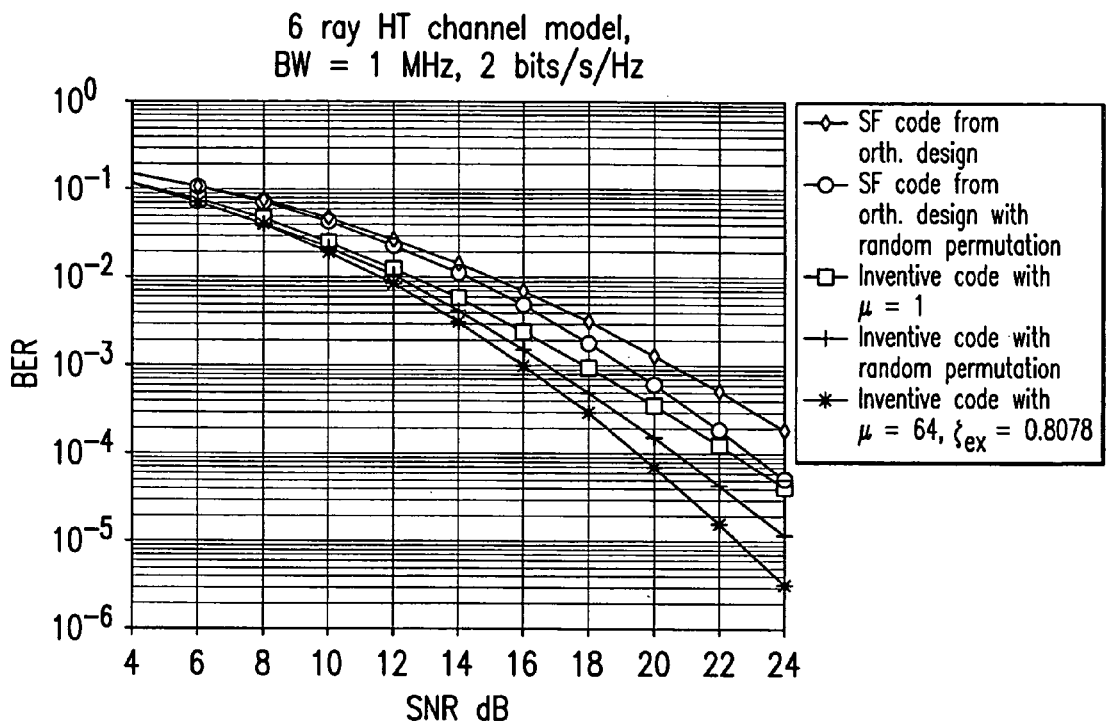
FIGS. 16A-16B are performance graphs comparing alternative constructions of space-frequency codes of the present invention.
Figure 16B:
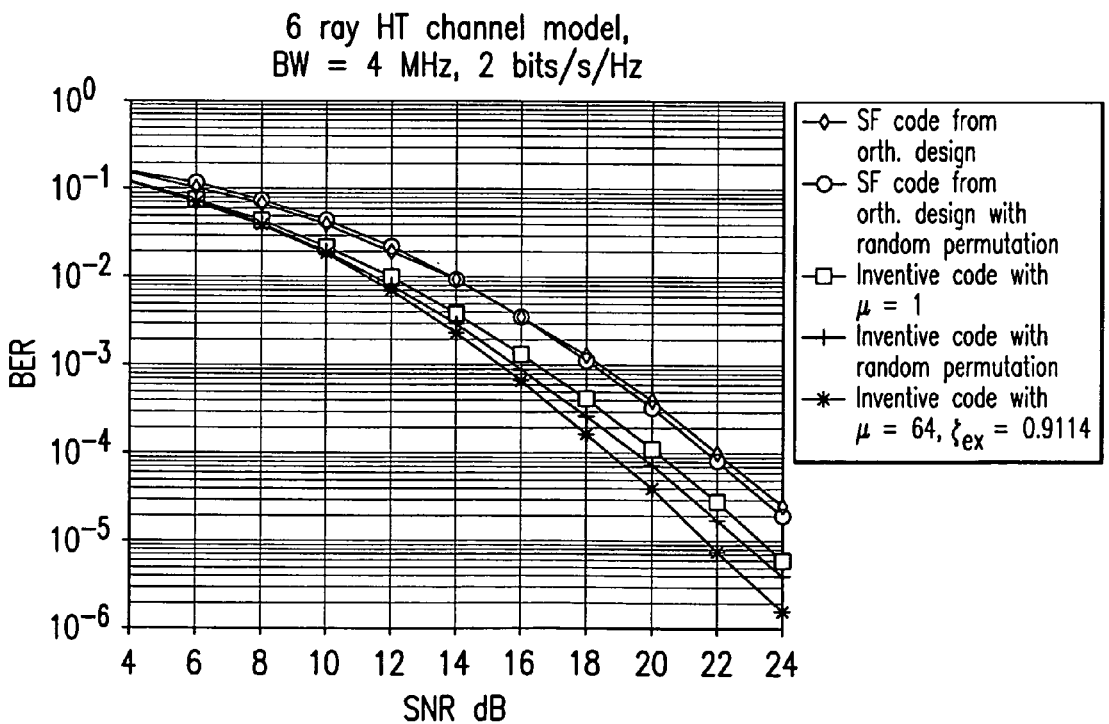

FIGS. 16A-16B provide the performance curves for the HT channel model. In case of BW=1 MHz, from FIG. 16A, it is observed that without permutation, the full-rate SF code of the present invention outperforms the SF code (107) by about 3 dB at a BER of $10^4$. With the random permutation (76), the performance of the proposed code is better than that of the code (107) by about 2 dB at a BER of $10^{-4}$. With the inventive permutation ($\mu_{op}$=64), an additional improvement of more than 1 dB is observed for the proposed SF code at a BER of $10^{-4}$. In the BW=4 MHz case, FIG. 16B shows that without permutation, the performance of the inventive full-rate code is better than that of the code (107) by about 1.5 dB at a BER of $10^{-4}$. With the random permutation, the inventive SF code outperforms the SF code from orthogonal design by about 2 dB at a BER of $10^4$. Compared to the SF code from orthogonal design with the random permutation, the SF code of the present invention with the optimum permutation has a total gain of 3 dB at a BER of $10^{-4}$.

The codes described above have among their beneficial features full space-frequency diversity, which is a clear improvement over the prior art. The concepts of the invention described above may be extended to achieve maximum diversity in all three of space, frequency and time, as is described below.

6. Space-Time-Frequency (STF) Codes

In the description of the channel model above, it was shown in (21) that $$P(C \rightarrow \tilde{C}) \leq \binom{2vM_r - 1}{vM_r} \left(\prod_{i=1}^{v} \lambda_i\right)^{-M_r} \left(\frac{\rho}{M_t}\right)^{-vM_r},$$

where v is the rank of Δ∘R, and $\lambda_1, \lambda_2, \ldots, \lambda_v$ are the non-zero eigenvalues of Δ∘R. The minimum value of the product $\prod_{i=1}^{v} \lambda_i$ over all pairs of distinct signals C and $\tilde{C}$ is termed as coding advantage, denoted by $$\zeta_{STF} = \min_{C \neq \tilde{C}} \prod_{i=1}^{v} \lambda_i. \quad (108)$$

If the minimum rank of Δ∘R is v for any pair of distinct STF codewords C and $\tilde{C}$, it is said that the STF code achieves a diversity order of $vM_r$. For a fixed number of OFDM blocks K, number of transmit antennas $M_t$ and correlation matrices $R_T$ and $R_F$, the maximum achievable diversity or full diversity is defined as the maximum diversity order that can be achieved by STF codes of size $KN \times M_t$.

According to the rank inequalities on Hadamard products and tensor products, $$\text{rank}(\Delta \circ R) \leq \text{rank}(\Delta)\text{rank}(R_T)\text{rank}(R_F).$$

Since the rank of $\Delta$ is at most $M_t$ and the rank of $R_F$ is at most $L$, then $$\text{rank}(\Delta \circ R) \leq \min\{LM_t\text{rank}(R_T), KN\}.$$

Thus, the maximum achievable diversity is at most $\min\{LM_tM_r\text{rank}(R_T) \times KNM_r\}$. Previous work has not discussed whether this upper bound can be achieved or not. However, through the present invention, this upper bound can indeed be achieved. It can also be observed that if the channel stays constant over multiple OFDM blocks (rank $(R_T)=1$), the maximum achievable diversity is only $\min\{LM_tM_r, KNM_r\}$. In this case, STF coding cannot provide additional diversity advantage compared to the SF coding approach described above.

Note that the proposed analytical framework includes ST and SF codes as special cases. If only one sub-carrier (N=1) is considered, and one delay path (L=1), the channel becomes a single-carrier, time-correlated, flat fading MIMO channel. The correlation matrix R simplifies to $R=R_T$, and the code design problem reduces to that of ST code design. In the case of coding over a single OFDM block (K=1), the correlation matrix R becomes $R=R_F$, and the code design problem simplifies to that of SF codes, such as those described above involving mapping.

Two exemplary STF code design methods to achieve the maximum achievable diversity order $\min\{LM_tM_r\text{rank}(R_T), KNM_r\}$ will now be described. Without loss of generality, it is assumed that the number of sub-carriers, N, is not less than $LM_t$ so the maximum achievable diversity order is $LM_tM_r\text{rank}(R_T)$.

Suppose that $C_{SF}$ is a full-diversity SF code of size $N \times M_t$, such as the SF codes described above. A full-diversity STF code, $C_{STF}$, may be constructed by repeating $C_{SF}$ K times over K OFDM blocks as follows:

$$C_{STF} = 1_{k \times 1} \otimes C_{SF}, \quad (109)$$

where $1_{k \times l}$ is an all one matrix of size $k \times l$. Let $$\Delta_{STF} = (C_{STF} - \tilde{C}_{STF})(C_{STF} - \tilde{C}_{STF})^\Psi$$

and $$\Delta_{SF} = (C_{SF} - \tilde{C}_{SF})(C_{SF} - \tilde{C}_{SF})^\Psi$$

Then, $$\Delta_{STF} = [1_{k \times l} \otimes (C_{SF} - \tilde{C}_{SF})][1_{l \times k} \otimes (C_{SF} - \tilde{C}_{SF})]1_{k \times k} \otimes \Delta_{SF}.$$

Thus, $$\Delta_{STF} \circ R = (1_{k \times k} \otimes \Delta_{SF}) \circ (R_T \otimes R_F)$$
$$= R_T \otimes (\Delta_{SF} \circ R_F).$$

Since the SF code $C_{SF}$ achieves full diversity in each OFDM block, the rank of $\Delta_{SF} \circ R_F$ is $LM_t$. Therefore, the rank of $\Delta_{STF} \circ R$ is $LM_t\text{rank}(R_T)$, so $C_{STF}$ in (109) is guaranteed to achieve a diversity order of $LM_tM_r\text{rank}(R_T)$.

It is to be noted that the maximum achievable diversity depends on the rank of the temporal correlation matrix $R_T$. If the fading channels are constant during K OFDM blocks, i.e., rank$(R_T)=1$, the maximum achievable diversity order for STF codes (coding across several OFDM blocks) is the same as that for SF codes (coding within one OFDM block). Moreover, if the channel changes independently in time, i.e. $R_T=I_K$, the repetition structure of STF code $C_{STF}$ in (109) is sufficient, but not necessary to achieve the full diversity. In this case, $$\Delta \circ R = \text{diag}(\Delta_1 \circ R_F, \Delta_2 \circ R_F, \ldots, \Delta_K \circ R_F),$$

where $\Delta_k = (C_k - \tilde{C}_k)(C_k - \tilde{C}_k)^\Psi$ for $1 \leq k \leq K$. Thus, in this case, the necessary and sufficient condition to achieve full diversity $KLM_tM_T$ is that each matrix $\Delta_k \circ R_F$ be of rank $LM_t$ over all pairs of distinct codewords simultaneously for all $1 \leq k \leq K$.

The repetition-coded STF code design of the present invention ensures full diversity at the price of symbol rate decrease by a factor of 1/K OFDM blocks compared to the symbol rate of the underlying SF code. The advantage of this approach is that any full-diversity SF code (block or trellis) can be used to design full-diversity STF codes.

In another aspect of the invention, a class of STF codes that can achieve a diversity order of $\Gamma M_t M_T \text{rank}(R_T)$ for any fixed integer $\Gamma(1 \leq \Gamma \leq L)$ by extending the full-rate full-diversity SF code construction method proposed for one OFDM block (K=1 case).

Consider a STF code structure consisting of STF codewords C of size $KN \times M_t$:

$$C = [C_1^T C_2^T \ldots C_K^T]^T \quad (110)$$

where $$C_k = [G_{k,1}^T G_{k,2}^T \ldots G_{k,P}^T 0_{N-P\Gamma M_t}^T]^T \quad (111)$$

for k=1, 2, ..., K. In (111), $P = \lfloor N/(\Gamma M_t) \rfloor$, and each matrix $G_{k,p}(1 \leq k \leq K, 1 \leq p \leq P)$ is of size $\Gamma M_t \times M_t$. The zero padding in (111) is used if the number of subcarriers N is not an integer multiple of $\Gamma M_t$. For each $p(1 \leq p \leq P)$, the code matrices $G_{1,p}$, $G_{2,p}$, ..., $G_{K,p}$ are designed jointly, but the design of $G_{1,p}$, $G_{2,p}$, ... $G_{K,p}$ is independent for different p values. For a fixed $p(1 \leq p \leq P)$, let $$G_{k,p} = \sqrt{M_t}\text{diag}(X_{k,1}, X_{k,2}, X_{k,M_t}), k=1, 2, \ldots, K \quad (112)$$

where $\text{diag}(X_{k,1}, X_{k,2}, \ldots X_{k,M_t})$ is a block diagonal matrix, $X_{k,i} = [x_{k,(i-1)\Gamma+1} \, X_{k,(i-1)\Gamma+2} \ldots x_{k,i\Gamma}]^T$, i=1, 2 ... $M_t$, and all $x_{k,j}, j=1, 2, \ldots \Gamma M_t$ are complex symbols and will be described in paragraphs that follow. The energy normalization condition is $$E\left(\sum_{k=1}^{K} \sum_{j=1}^{\Gamma M_t} |x_{k,j}|^2\right) = K\Gamma M_t.$$

The symbol rate of the proposed scheme is $P\Gamma M_t/N$, ignoring the cyclic prefix. If N is a multiple of $\Gamma M_t$, the symbol rate is 1. If not, the rate is less than 1, but since N is typically much greater than $\Gamma M_t$, the symbol rate is very close to 1. Full rate is defined as one channel symbol per subcarrier per OFDM block period, so the inventive method can either achieve full symbol rate, or it can perform very close to it. Note that this scheme includes the code design method described above as a special case when K=1.

A sufficient condition will now be shown for the STF codes described above to achieve a diversity order of $\Gamma M_t M_r \text{rank}(R_T)$. For simplicity, we use the notation $X = [x_{l,1} \ldots x_{l,\Gamma M_t} \ldots x_{K,1} \ldots x_{K,\Gamma M_t}]$ and $\tilde{X} = [\tilde{x}_{l,1} \ldots \tilde{x}_{l,\Gamma M_t} \ldots \tilde{x}_{K,1} \ldots \tilde{x}_{K,\Gamma M_t}]$. Moreover, for any n×n non-negative definite matrix A, its eigenvalues will be denoted in a non-increasing order as: $eig_1(A) \geq eig_2(A) \geq \ldots \geq eig_n(A)$. Then, for any STF code constructed by (110)-(112), $\Pi_{k=1}^{K}\Pi_{j=1}^{\Gamma M_t}|x_{k,j} - \tilde{x}_{k,j}| \neq 0$ for any pair of distinct symbols X and $\tilde{X}$, the STF code achieves a diversity order of $\Gamma M_r M_T \text{rank}(R_T)$, and the coding advantage is bounded by $$(M_t \delta_{min})^{\Gamma M_t \text{rank}(R_T)} \Phi \leq \zeta_{STF} \leq (M_t \delta_{max})^{\Gamma M_t \text{rank}(R_T)} \Phi, \quad (113)$$

where $$\delta_{min} = \min_{X \neq \tilde{X}} \min_{1 \leq k \leq K, 1 \leq j \leq \Gamma M_t} |x_{k,j} - \tilde{x}_{k,j}|^2, \quad (114)$$

$$\delta_{max} = \max_{X \neq \tilde{X}} \max_{1 \leq k \leq K, 1 \leq j \leq \Gamma M_t} |x_{k,j} - \tilde{x}_{k,j}|^2, \quad (115)$$

$$\Phi = |\det(Q_0)|^{M_t \text{rank}(R_T)} \prod_{i=1}^{\text{rank}(R_T)} (eig_1(R_T))^{\Gamma M_t}, \quad (116)$$

and $$Q_0 = W_0 \text{diag}(\delta_0^2, \delta_1^2, \ldots, \delta_{L-1}^2) W_0^{\Psi}, \quad (117)$$

$$W_0 = \begin{bmatrix} 1 & 1 & \ldots & 1 \\ \omega^{\tau_0} & \omega^{\tau_1} & \ldots & \omega^{\tau_{L-1}} \\ \vdots & \vdots & \ddots & \vdots \\ \omega^{(\Gamma-1)\tau_0} & \omega^{(\Gamma-1)\tau_1} & \ldots & \omega^{(\Gamma-1)\tau_{L-1}} \end{bmatrix}_{\Gamma \times L} \quad (118)$$

Furthermore, if the temporal correlation matrix $R_T$ is of full rank, i.e., rank $(R_T) = K$, the coding advantage is $$\zeta_{STF} = \delta M_t^{KTM_t} |\det(R_t)|^{\Gamma M_t} |\det(Q_0)|^{KM_t}, \quad (119)$$

where $$\delta = \min_{X \neq \tilde{X}} \prod_{k=1}^{K} \prod_{j=1}^{\Gamma M_t} |x_{k,j} - \tilde{x}_{k,j}|^2. \quad (120)$$

From the above, it should be observed that with the code structure specified in (110)-(112), it is not difficult to achieve the diversity order of $\Gamma M_r M_T \text{rank}(R_T)$. The remaining problem is to design a set of complex symbol vectors, $X = [x_{1,1} \ldots x_{1,\Gamma M_t} \ldots x_{K,1} \ldots X_{K,\Gamma,M_t}]$, such that the coding advantage $\zeta_{STF}$ is as large as possible. One approach is to maximize $\delta_{min}$ and $\delta_{max}$ in (113) according to the lower and upper bounds of the coding advantage. Another approach is to maximize $\delta$ in (120). The latter case will be illustrated and offers advantages over the former approach. First, the coding advantage $\zeta_{STF}$ in (119) is determined by $\delta$ in closed form, although this closed form only holds with the assumption that the temporal correlation matrix $R_T$ is of full rank. Second, the problem of designing X to maximize $\delta$ is related to the problem of constructing signal constellations for Rayleigh fading channels, which has been well solved in the prior art. In the literature, $\delta$ is called the minimum product distance of the set of symbols X.

To implement X in order to maximize the minimum product distance $\delta$, denote $L = KTM_t$ and assume that $\Omega$ is a constellation such as QAM, PAM, and so on. The set of complex symbol vectors is obtained by applying a transform over a L-dimensional signal set $\Omega^L$. Specifically, $$X = S \cdot \frac{1}{\sqrt{L}} V(\theta_1, \theta_2, \ldots, \theta_L), \quad (121)$$

where $S = [s_1 \ s_2 \ \ldots \ s_L] \in \Omega^K$ is a vector of arbitrary channel symbols to be transmitted, and $V(\theta_1, \theta_2, \ldots, \theta_L)$ is a Vandermonde matrix with variables $\theta_1, \theta_2, \theta_L$:

$$V(\theta_1, \theta_2, \ldots, \theta_L) = \begin{bmatrix} 1 & 1 & \ldots & 1 \\ \theta_1 & \theta_2 & \ldots & \theta_L \\ \vdots & \vdots & \ddots & \vdots \\ \theta_1^{L-1} & \theta_2^{L-1} & \ldots & \theta_L^{L-1} \end{bmatrix} \quad (122)$$

The optimum $\theta_l, 1 \leq l \leq L$, have been specified for different L and $\Omega$. For example, if $\Omega$ is a QAM constellation, and $L = 2^S$ ($S \geq 1$), the optimum $\theta_l$'s are given by $$\theta_l = e^{j\frac{4l-3}{2L}}, l = 1, 2, \ldots, L \quad (123)$$

In case of $L = 2^s \cdot 3^t (s \geq 1, t \geq 1)$, a class of $\theta_l$'s are given as $$\theta_l = e^{j\frac{6l-5}{3L}\pi}, l = 1, 2, \ldots, L \quad (124)$$

These relationships are known in the field of coding through various signal constellations. The STF code design discussed in this subsection achieves full symbol rate, which is much larger than that of the repetition coding approach. However, the maximum-likelihood decoding complexity of this approach is high. Its complexity increases exponentially with the number of OFDM blocks, K, while the decoding complexity of the repetition-coded STF codes increases only linearly with K. Fortunately, known sphere decoding methods can be used to reduce the complexity.

The inventive STF code design methods have been implemented for different fading channel models, and their performance compared. The OFDM modulation had N=128 subcarriers, and the total bandwidth was 1 MHz. Thus, the OFDM block duration was 128 μs for all cases. As in previous examples, the average bit error rate (BER) curves are illustrated as functions of the average signal-to-noise radio (SNR).

Both a block code and a trellis code were implemented in the illustrative example. The simulated communication system had $M_T = 1$ receive antenna as well as a two-ray, equal power delay profile (L=2), with a delay of 20 μs between the two rays. Each ray was modeled as a zero mean complex Gaussian random variable with variance 0.5.

Figure 12A:
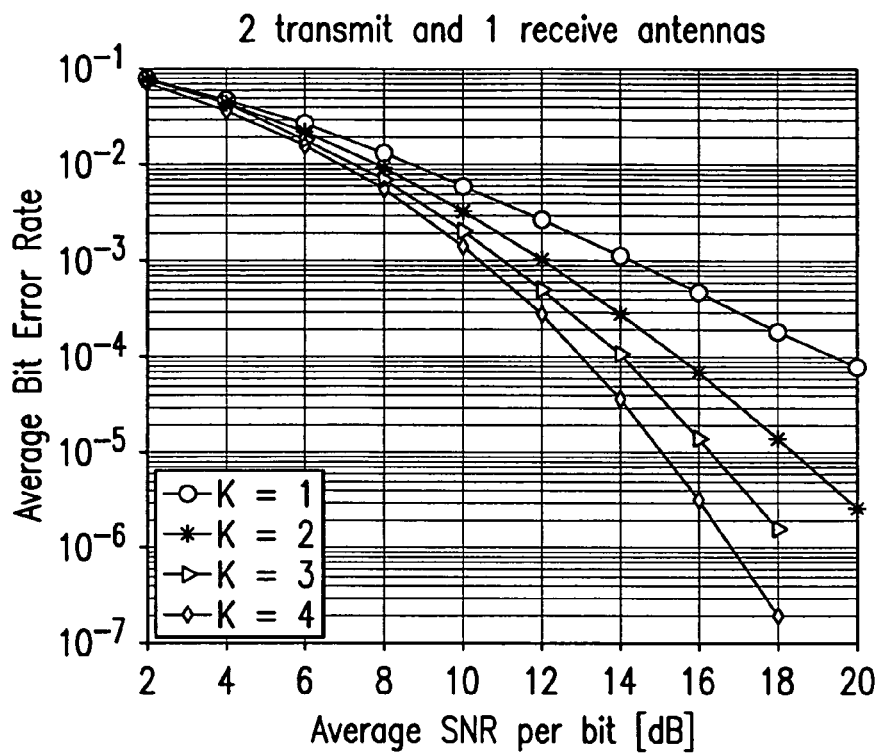
FIGS. 12A-12B are performance graphs of an exemplary space-time-frequency code of the present invention.

The full-diversity STF block codes were obtained by repeating a full-diversity SF block code via (109) across K=1, 2, 3, 4 OFDM blocks. The full-diversity SF block code for $M_t=2$ transmit antennas was constructed from the Alamouti scheme with QPSK modulation via mapping described above. The spectral efficiency of the resulting STF code is 1, 0.5, 0.33, 0.25 bit/s/Hz (omitting the cyclic prefix) for K=1, 2, 3, 4, respectively. The full-diversity STF block code was simulated without temporal correlation ($R_T$ was an identity matrix). From FIG. 12A, it is observed that by repeating the SF code over multiple OFDM blocks, the achieved diversity order can be increased.

Figure 12B:
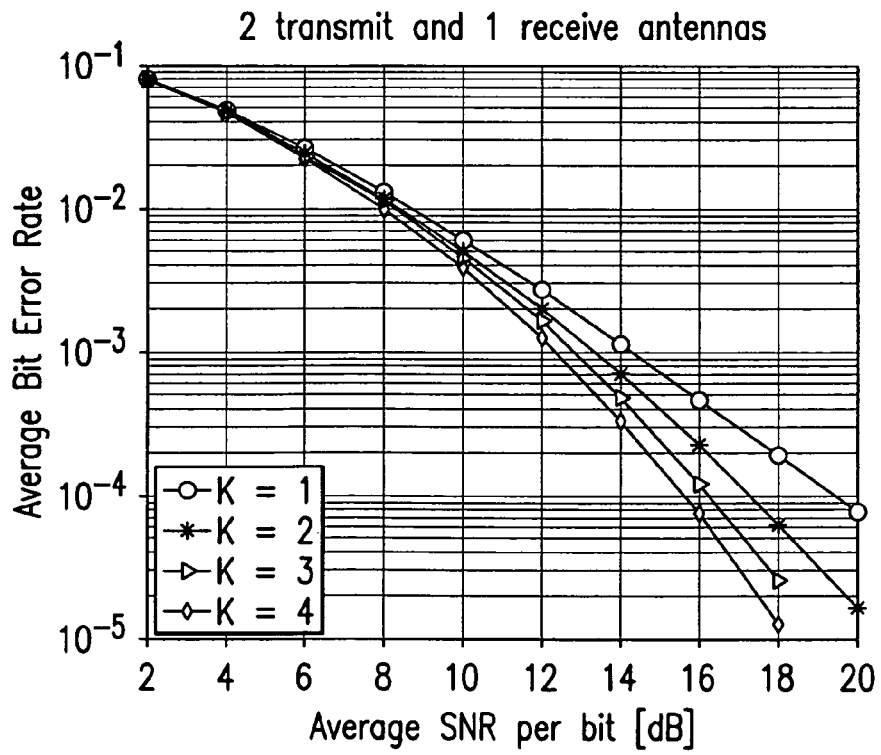

The simulated full-diversity STF trellis code was obtained from a full-diversity SF trellis code via (109) with K=1, 2, 3, 4, respectively. The used full-diversity SF trellis code for $M_t=3$ transmit antennas was constructed by applying the repetition mapping above to the prior art 16-state, QPSK ST trellis code. Since the modulation was the same in all four cases, the spectral efficiency of the resulting STF codes were 1, 0.5, 0.33, 0.25 bit/s/Hz (omitting the cyclic prefix) for K=1, 2, 3, 4, respectively. Similarly to the previous case, it was assumed that the channel changes independently from OFDM block to OFDM block. The obtained BER curves can be observed in FIG. 12B. As is apparent from the Figure, the STF codes (K>1) achieved higher diversity order than the SF code (K=1).

In a second illustrative demonstration, we used a more realistic Typical Urban (TU) channel model, which is shown in FIG. 11A, and simulated the fading channel with different temporal correlations. It was assumed that the fading channel is constant within each OFDM block period, but varies from one OFDM block period to another according to a first order Markovian model $$\alpha_{i,j}^k(l)=\epsilon\alpha_{i,j}^{k-1}(l)+\eta_{i,j}^k(l), 0\leq l\leq L-1 \quad (125)$$

where the constant $\epsilon(0\leq\epsilon\leq 1)$ determines the amount the temporal correlation, and $\eta_{i,j}^k(l)$ is a zero-mean, complex Gaussian random variable with variance $\delta_l\sqrt{1-\epsilon^2}$. If $\epsilon=0$, there is no temporal correlation (independent fading), while if $\epsilon=1$, the channel stays constant over multiple OFDM blocks. We considered three temporal correlation scenarios: $\epsilon=0$, $\epsilon=0.8$ and $\epsilon=0.95$.

The simulated full-rate STF codes were constructed by (110)-(112) for $M_t=2$ transmit antennas with $\Gamma=2$. The set of complex symbol vectors X were obtained via (121) by applying Vandermonde transforms over a signal set $\Omega^{4K}$ for K=1, 2, 3, 4. The Vandermonde transforms were determined for different K values according to (123) and (124). The constellation $\Omega$ was chosen to be BPSK. Thus, the spectral efficiency the resulting STF codes were 1 bit/s/Hz (omitting the cyclic prefix), which is independent of the number of jointly encoded OFDM blocks, K.

Figure 13A:
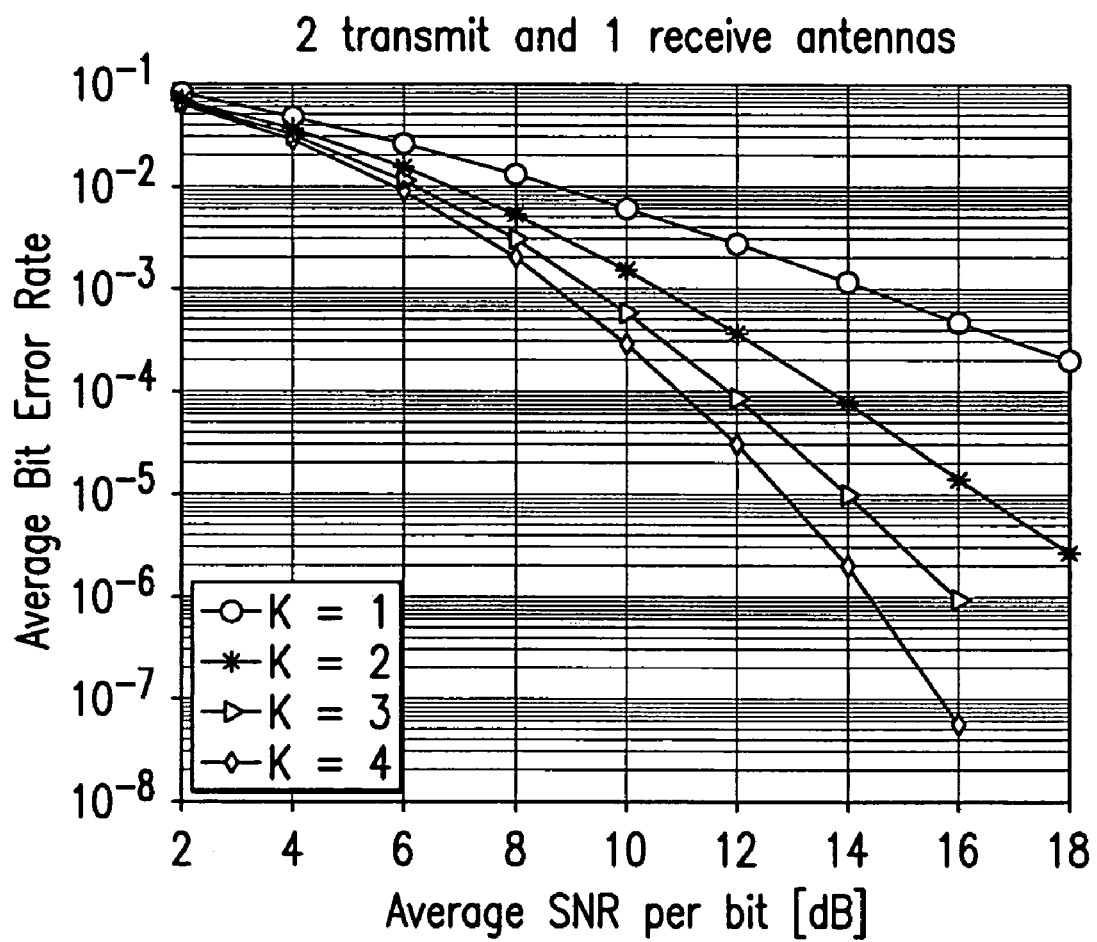
FIGS. 13A-13C are performance graphs of exemplary space-time-frequency codes of the present invention.
Figure 13B:
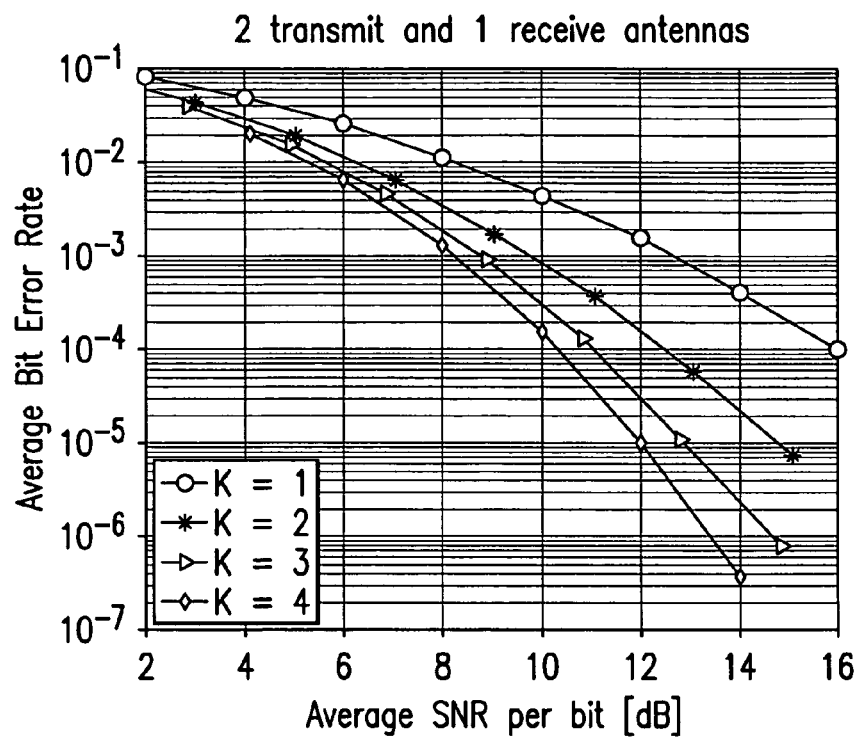
Figure 13C:
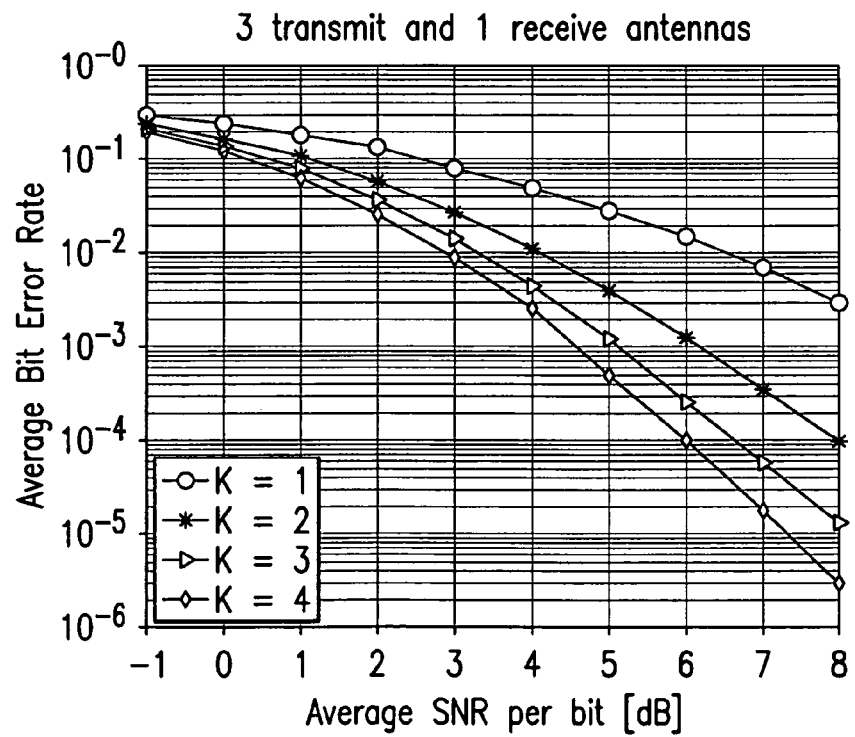

The performances of the full-rate STF codes are depicted in FIGS. 13A-13C for the three different temporal correlation scenarios. From the Figures, it can be observed that the diversity code of the STF code increases with the number of jointly encoded OFDM blocks, K. However, the improvement of the diversity order depends on the temporal correlation. The performance gain obtained by coding across multiple OFDM blocks decreases as the correlation factor $\epsilon$ increases. For example, without temporal correlation ($\epsilon=0$), the STF code with K=4 achieves an average BER of about $6.0\times10^{-8}$ at a SNR of 16 dB. In case of the correlated channel model and $\epsilon=0.8$, the STF code with K=4 has an average BER of only $3.0\times10^{-6}$ at a SNR of 16 dB. Finally, in case of the correlated channel model and $\epsilon=0.95$, the STF code with K=4 has an average BER of around $10^{-4}$ at a SNR of 16 dB.

Figure 17:
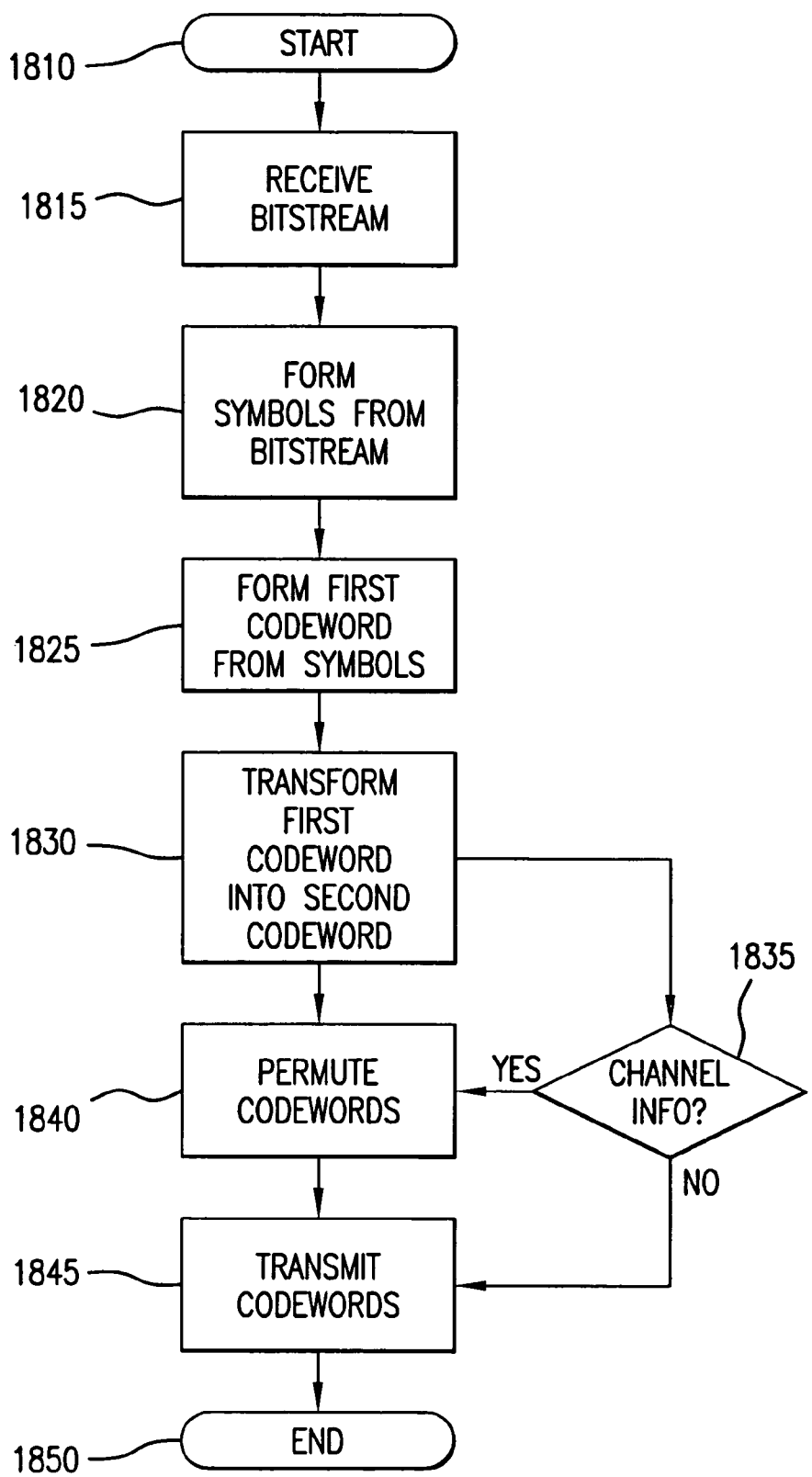
FIG. 17 is a flow diagram depicting fundamental method steps of certain embodiments of the present invention.

Referring to FIG. 17, there is shown in a flow diagram form fundamental method steps of certain embodiments of the present invention. As is shown in the Figure, the method is entered at start block 1810, where flow is transferred to block 1815, wherein a data bitstream is received. At block 1820, symbols are formed in accordance with said bitstream. The symbols may be selected from, for example, a constellation. Flow is transferred then to block 1825, where a first codeword is formed from the symbols. The first codeword may take the form of a set of constellation symbols, for example, or may be a codeword from another encoding process, such as an ST or SF encoder. Once the first codeword has been formed, flow is passed to block 1830, where a transform is applied to the first codeword to produce a second codeword. The transform may be a function performed on the symbols of the first codeword, for example, phasor rotation, or may be a rearranging of elements of the first codeword, for example, the rows or blocks thereof, into the second codeword.

Once the second codeword has been formed, certain embodiments of the invention will ascertain whether channel characteristic information is available to the transmitter, as indicated at decision block 1835. If the decision is in the affirmative, certain embodiments of the invention will perform permutations on the second codeword, such as those permutations described above, as indicated at block 1840. If the channel information is not available, the permutations are not performed and flow is transferred immediately to block 1850. The second codeword, either permuted or not, is then transmitted in accordance with the invention, as indicated at block 1850. The method then exits at block 1850.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefor, elements and methods individually described may be combined, and elements described as discrete may be distributed across many components. The scope of the invention should therefore be determined with reference to the appended claims, along with their full range of equivalents.

What is claimed is:

1. A method for conveying an encoded data stream in a wireless communication system, the method comprising the steps of:
    providing a non-precoded data stream;
    providing a transmitter having a plurality of transmit antennas, said transmitter including means for simultaneously transmitting via each of said transmit antennas a corresponding symbol over a corresponding one of a plurality of frequencies;
    providing a receiver having a plurality of receive antennas, said receiver including means for recovering the non-precoded data stream from the symbols transmitted over said plurality of frequencies, where a region of space between each of said plurality of transmit antennas and each of said plurality of receive antennas defines a transmission channel;
    forming a first diversity-coded codeword from symbols corresponding to data in the data stream, the diversity-coded codeword defining a two-dimensional block codeword across said plurality of transmit antennas in the spatial domain and across a plurality of sub-carriers in the frequency domain;
    applying a transform to said first diversity-coded codeword to produce a second diversity-coded codeword, said second diversity-coded codeword including a plurality of column vectors equal in number to said number of transmit antennas and including a plurality of rows equal in number to an integer multiple of said plurality of frequencies;
    transmitting said second diversity-coded codeword such that symbols thereof in of each said column vector are transmitted via a corresponding one of said plurality of transmit antennas and symbols thereof in each said row are transmitted over a corresponding one of said plurality of frequencies; and receiving at said receiver said second diversity-coded codewords via said plurality of receive antennas and said plurality of frequencies and recovering the non-precoded data stream therefrom; wherein said transmitter has no a priori knowledge of transmission characteristics of the transmission channel;

wherein the first diversity-coded codeword is formed to achieve a maximum diversity order for a multi-antenna frequency-selective channel.

2. The method for conveying an encoded data stream as recited in claim 1, where said transform applying step includes the step of applying said transform such that said symbols of said second diversity-coded codeword belong to a set of symbols in which a minimum product distance between symbols thereof is maximized.

3. The method for conveying an encoded data stream as recited in claim 2 including the steps of:

performing the following steps in said first diversity-coded codeword forming step:
  selecting a symbol vector size;
  forming a symbol vector of said symbols corresponding to said non-precoded data stream, said symbol vector corresponding in size to said symbol vector size, each of said symbols characterized by a phasor in a complex plane; and
  forming said first diversity-coded codeword from a set of said symbol vectors; and performing the following steps in said transform applying step:
  rotating through an angle in said complex plane each symbol in each of said plurality of symbol vectors of said first diversity-coded codeword; and
  forming said second diversity-coded codeword from a plurality of said rotated first diversity-coded codewords, each of said column vectors of said second diversity-coded codeword including in adjacent rows thereof all of said rotated symbols from at least one of said symbol vectors.

4. The method for conveying an encoded data stream as recited in claim 3, where said first diversity-coded codeword forming step includes the step of selecting said first diversity-coded codeword from a signal constellation in accordance with said data of said non-precoded data stream.

5. The method for conveying an encoded data stream as recited in claim 4, where said symbol rotating step includes the step of dividing a unit circle into a plurality of discrete angles and rotating said each symbol to one of said discrete angles in accordance with a position of said symbol in said symbol vector.

6. The method for conveying an encoded data stream as recited in claim 5, where said unit circle dividing step includes the step of dividing said unit circle in to said plurality of discrete angles, said plurality of angles being in number proportional to said symbol vector size multiplied by said number of transmit antennas.

7. The method for conveying an encoded data stream as recited in claim 3, further including the steps of:
  providing to said transmitter transmission characteristics of said each transmission channel;
  determining a frequency separation factor corresponding to said channel characteristics; and
  permuting rows of said second codeword such that said rotated symbols in said adjacent rows are separated by a plurality of rows corresponding in number to a separation in frequency substantially equal to said frequency separation factor.

8. The method for conveying an encoded data stream as recited in claim 7, where said channel characteristics providing step includes the step of providing symbol delay time and a corresponding power scaling factor for each of said channels as said transmission characteristics.

9. The method for conveying an encoded data stream as recited in claim 1 including the steps of:
  forming as said first diversity-coded codeword a space-time encoded codeword corresponding to said non-precoded data stream in said first diversity-coded codeword forming step, said symbols of said space-time encoded first codeword equal in number to said plurality of transmit antennas;
  repeating rows of said first diversity-coded codeword as said rows of said second diversity-coded codeword in said transform applying step.

10. The method for conveying an encoded data stream as recited in claim 2 including the steps of:
  selecting an integer-valued temporal correlation factor;
  performing the following steps in said first codeword forming step:
    selecting a symbol vector size;
    forming a symbol vector of said symbols corresponding to said non-precoded data stream, said symbol vector corresponding in size to said symbol vector size, each of said symbols characterized by a phasor in a complex plane; and
    forming said first diversity-coded codeword from a set of said symbol vectors; and
  performing the following steps in said transform applying step:
    rotating through an angle in said complex plane each symbol in each of said plurality of symbol vectors of said first diversity-coded codeword;
    forming a block from a plurality of said rotated first diversity-coded codewords, said block including a plurality of column vectors equal in number to said number of transmit antennas and including a plurality of rows equal in number to said plurality of frequencies, each of said column vectors of said block including in adjacent rows thereof all of said rotated symbols from at least one of said symbol vectors; and
    forming said second diversity-coded codeword from a plurality of said blocks such that said plurality of rows thereof is equal in number to said temporal correlation factor times said plurality of frequencies; and
  transmitting said second diversity-coded codeword in temporally successive ones of said blocks in said second diversity-coded codeword transmitting step.

11. The method for conveying an encoded data stream as recited in claim 10, where said symbol rotating step includes the step of dividing a unit circle into a plurality of discrete angles and rotating said each symbol to one of said discrete angles in accordance with a position of said symbol in said symbol vector.

12. The method for conveying an encoded data stream as recited in claim 11, where said unit circle dividing step includes the step of dividing said unit circle in to said plurality of discrete angles, said plurality of angles being in number proportional to said symbol vector size multiplied by said number of transmit antennas.

13. The method for conveying an encoded data stream as recited in claim 1 including the steps of:

forming as said first diversity-coded codeword a space-frequency encoded codeword corresponding to said non-precoded data stream in said first diversity-coded codeword forming step, said symbols of said space-time encoded first codeword equal in number to said plurality of transmit antennas; and repeating said first diversity-coded codeword as said blocks of said second diversity-coded codeword in said transform applying step, said second diversity-coded codeword including a plurality of blocks, each block including a number of columns equal in number to said plurality of transmit antennas and a number of rows equal in number to said plurality of frequencies; and transmitting said second diversity-coded codeword in temporally successive ones of said blocks in said second diversity-coded codeword transmitting step.

14. An apparatus for conveying data in a broadband wireless communication system, the system comprising:

a transmitter having a plurality of transmit antennas and a plurality of orthogonal frequency modulators for modulating a transmission symbol onto each of a corresponding plurality of frequencies;

an encoder for encoding a non-precoded data stream into a diversity-coded codeword, the diversity-coded codeword defining a two-dimensional block codeword across said plurality of transmit antennas in the spatial domain and across a plurality of sub-carriers in the frequency domain; said diversity-coded codeword having a plurality of columns equal in number to said number of transmit antennas and a plurality of rows equal in number to an integer multiple of said plurality of frequencies, said encoder being coupled to said transmitter such that a transmission symbol at a row of said diversity-coded codeword and a column of said diversity-coded codeword is transmitted via a transmit antenna corresponding to said column of said diversity-coded codeword over a frequency corresponding to said row of said diversity-coded codeword, said encoder being further operable to establish a set of symbols in which a minimum product distance is maximized, said set including said transmission symbols of said diversity-coded codeword;

a receiver having a plurality of receive antennas and a plurality of orthogonal frequency demodulators for demodulating each of said corresponding plurality of frequencies, where a region of space between each of said transmit antennas and each of said receive antennas defines a corresponding one of a plurality of transmission channels;

a decoder coupled to said receiver for decoding said transmitted diversity-coded codeword and recovering therefrom said non-precoded data stream;

wherein the non-precoded data stream is encoded to achieve the maximum achievable diversity order for a multi-antenna frequency-selective channel.

15. The apparatus for conveying data as recited in claim 14, further including:

a channel monitor operable to determine channel characteristics of each of said plurality of transmission channels; and an interleaver for permuting rows of said codeword in accordance with said channel characteristics.

16. An apparatus for conveying data in a broadband wireless communication system, the system comprising:

a transmitter having a plurality of transmit antennas and a plurality of orthogonal frequency modulators for modulating a transmission symbol onto each of a corresponding plurality of frequencies;

an encoder for encoding a non-precoded data stream into a first diversity-coded codeword, the first diversity-coded codeword defining a two-dimensional block codeword across said plurality of transmit antennas in the spatial domain and across a plurality of sub-carriers in the frequency domain;

a mapper for mapping said first diversity-coded codeword onto a second diversity-coded codeword, said second diversity-coded codeword being characterized by a matrix of transmission symbols having a plurality of columns equal in number to said number of transmit antennas and a plurality of rows equal in number to an integer multiple of said plurality of frequencies, said encoder being coupled to said transmitter such that a transmission symbol at a row of said second diversity-coded codeword and a column of said second diversity-coded codeword is transmitted via a transmit antenna corresponding to said column of said second diversity-coded codeword over a frequency corresponding to said row of said second diversity-coded codeword;

a receiver having a plurality of receive antennas and a plurality of orthogonal frequency demodulators for demodulating each of said corresponding plurality of frequencies, where a region of space between each of said transmit antennas and each of said receive antennas defines a corresponding one of a plurality of transmission channels;

a decoder coupled to said receiver for decoding said transmitted second diversity-coded codeword and recovering therefrom said non-precoded data stream;

wherein the non-precoded data stream is encoded to achieve the maximum achievable diversity order for a multi-antenna frequency-selective channel.

17. The apparatus for conveying data as recited in claim 16, wherein said encoder is a space-time encoder for encoding a space-time codeword and said mapper maps said space-time codeword onto a space-frequency codeword.

18. The apparatus for conveying data as recited in claim 17, wherein said mapper is operable to repeat said space-time codeword on each of a plurality of rows of said space-frequency codeword.

19. The apparatus for conveying data as recited in claim 16, wherein said encoder is a space-frequency encoder for encoding a space-frequency codeword and said mapper maps said space-frequency codeword onto a space-time-frequency codeword.

20. The apparatus for conveying data as recited in claim 19, wherein said mapper is operable to repeat said space-frequency codeword on each of a plurality of blocks of said space-time-frequency codeword.

* * * * *